United States Patent
Hotta et al.

(10) Patent No.: US 7,979,609 B2
(45) Date of Patent: Jul. 12, 2011

(54) CONTROL SYSTEM AND COMMUNICATION SYSTEM FOR DIGITAL MIXER

(75) Inventors: Harumichi Hotta, Hamamatsu (JP);
Masaki Kudo, Hamamatsu (JP);
Masaru Aiso, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 160 days.

(21) Appl. No.: 12/487,606

(22) Filed: Jun. 18, 2009

(65) Prior Publication Data
US 2009/0259779 A1    Oct. 15, 2009

Related U.S. Application Data

(63) Continuation of application No. 11/377,126, filed on Mar. 15, 2006, now abandoned.

(30) Foreign Application Priority Data

Mar. 24, 2005   (JP) ................................. 2005-085774
Mar. 24, 2005   (JP) ................................. 2005-085786

(51) Int. Cl.
*G06F 3/00*    (2006.01)
*G10H 1/18*    (2006.01)

(52) U.S. Cl. .......................................... 710/62; 84/615

(58) Field of Classification Search .................... 710/62; 84/615

See application file for complete search history.

(56) References Cited

U.S. PATENT DOCUMENTS

| | | | |
|---|---|---|---|
| 5,710,890 A | | 1/1998 | Hermer et al. |
| 5,797,752 A | * | 8/1998 | Umezawa ................. 434/307 A |
| 6,353,169 B1 | * | 3/2002 | Juszkiewicz et al. ........... 84/600 |
| 6,700,050 B2 | | 3/2004 | Sakurada et al. |
| 6,847,614 B2 | | 1/2005 | Banker et al. |
| 6,874,052 B1 | | 3/2005 | Delmonico |
| 7,240,106 B2 | | 7/2007 | Cochran et al. |
| 7,319,187 B2 | * | 1/2008 | Sunako .......................... 84/662 |
| 2002/0117044 A1 | * | 8/2002 | Sakurada et al. ............... 84/600 |
| 2003/0172797 A1 | | 9/2003 | Juszkiewicz et al. |
| 2004/0133894 A1 | | 7/2004 | Juszkiewicz et al. |
| 2006/0218321 A1 | | 9/2006 | Hotta et al. |

FOREIGN PATENT DOCUMENTS

| | | |
|---|---|---|
| JP | 8-263434 A | 10/1996 |
| JP | 2002-175269 A | 6/2002 |
| JP | 2003-348089 | 12/2003 |
| JP | 2004-221905 | 8/2004 |

OTHER PUBLICATIONS

Anonymous. (Mar. 1, 1985). *Personal Computer Data Communication, Protocol Handbook*, Asahi News Paper, pp. 144-148, with English translation.
Notice of Reasons for Rejection mailed May 22, 2009, for JP Application No. 2005-085786, with English translation, five pages.
Notice of Reasons for Rejection mailed May 20, 2008, for JP Application No. 2005-085774, with English Translation, five pages.

* cited by examiner

*Primary Examiner* — Henry W Tsai
*Assistant Examiner* — Titus Wong
(74) *Attorney, Agent, or Firm* — Morrison & Foerster LLP

(57) ABSTRACT

In a control system of a digital mixer, first class devices are connected via a first class bus, and second class devices are connected to each first class device via a second class bus. The number of first class devices, which require a specific function for adding source and destination addresses to data, can be reduced by the number of the second class devices. Moreover, the second class device which does not require the specific function for adding source and destination addresses to data input/output operations is cheaper than the first class device, resulting in the implementation of simplified configuration and reduced production costs.

17 Claims, 20 Drawing Sheets

FIG. 7

| COMMAND | DESTINATION ADDRESS | SOURCE ADDRESS | FIRST DATA | SECOND DATA | THIRD DATA |
|---|---|---|---|---|---|
| (1) COMMON PROTOCOL | | | | | |
| C01: E-BUS START | CHILD* | PARENT | 0h | 00h | 00h |
| C02: CATEGORY ID, SUB-ADDRESS, REQUEST | CHILD* | PARENT | 00h | 00h | 00h |
| C03: CATEGORY ID, SUB-ADDRESS, REPLY | PARENT | CHILD | 00h | CATEGORY ID | SUB-ADDRESS |
| C04: OTHERS | PARENT/ CHILD | CHILD/ PARENT | 02h~0Fh | PARAMETER | PARAMETER |
| (2) STANDARD PROTOCOL (2-1) DATA TRANSMISSION (CHILD SYSTEM TO PARENT SYSTEM) | | | | | |
| C11: SW OFF | PARENT | CHILD | 6xh | SW NUMBER | 00h (dummy) |
| C12: SW ON | PARENT | CHILD | 7xh | SW NUMBER | 00h (dummy) |
| C13: JOG CONTROLLER | PARENT | CHILD | Cxh | CATEGORY (8-bits) | VALUE (8-bits) |
| C14: CONTINUOUS CONTROLLER | PARENT | CHILD | Exh | VALUE (UPPER 8-bits) | VALUE (LOWER 8-bits) |
| (2-2) DATA TRANSMISSION (PARENT SYSTEM TO CHILD SYSTEM) | | | | | |
| C21: LED CONTROL | CHILD | PARENT | 6xh | GROUP NUMBER (8-bits) | LED BRIGHTNESS (8-bits) |
| C22: LED GROUP SETUP | CHILD | PARENT | 7xh | LED NUMBER (8-bits) | GROUP NUMBER (8-bits) |
| C23: JOG CONTROLLER | CHILD | PARENT | Cxh | CATEGORY (8-bits) | VALUE (8-bits) |
| C24: CONTINUOUS CONTROLLER | CHILD | PARENT | Exh | VALUE (UPPER 8-bits) | VALUE (LOWER 8-bits) |

*: GENERAL CALL AVAILABLE
x: PORT NUMBER

POINT TO POINT COMMUNICATION CONNECTION

POINT TO MULTI-POINT COMMUNICATION CONNECTION

※ OPEN DRAIN OUTPUT

EXAMPLE

: COMMUNICATION FROM CHILD SYSTEM TO GRANDCHILD SYSTEM
: COMMUNICATION FROM GRANDCHILD SYSTEM TO CHILD SYSTEM

CHILD SYSTEM TRANSMISSION PACKET

400 — STATUS (401), COMMAND (1) (402), COMMAND (2) (403), COMMAND (3) (404)

CHILD SYSTEM RECEPTION PACKET

410 — STATUS (411), COMMAND (1) (412), COMMAND (2) (413), COMMAND (3) (414)

ARBITRATION PACKET

420 — STATUS (421), REPLY (422)

CONTENTS OF STATUS BYTES 401, 411, AND 412

CONTENTS OF REPLY BYTE 422

| TXREQ OUTPUT | GRANDCHILD SYSTEM ADDRESS | REPLY BYTE |
|---|---|---|
| EXIST | 0 (000b) | 11111110b |
| | 1 (001b) | 11111101b |
| | 2 (010b) | 11111011b |
| | 3 (011b) | 11110111b |
| | 4 (100b) | 11101111b |
| | 5 (101b) | 11011111b |
| | 6 (110b) | 10111111b |
| NO EXIST | - | 11111111b |

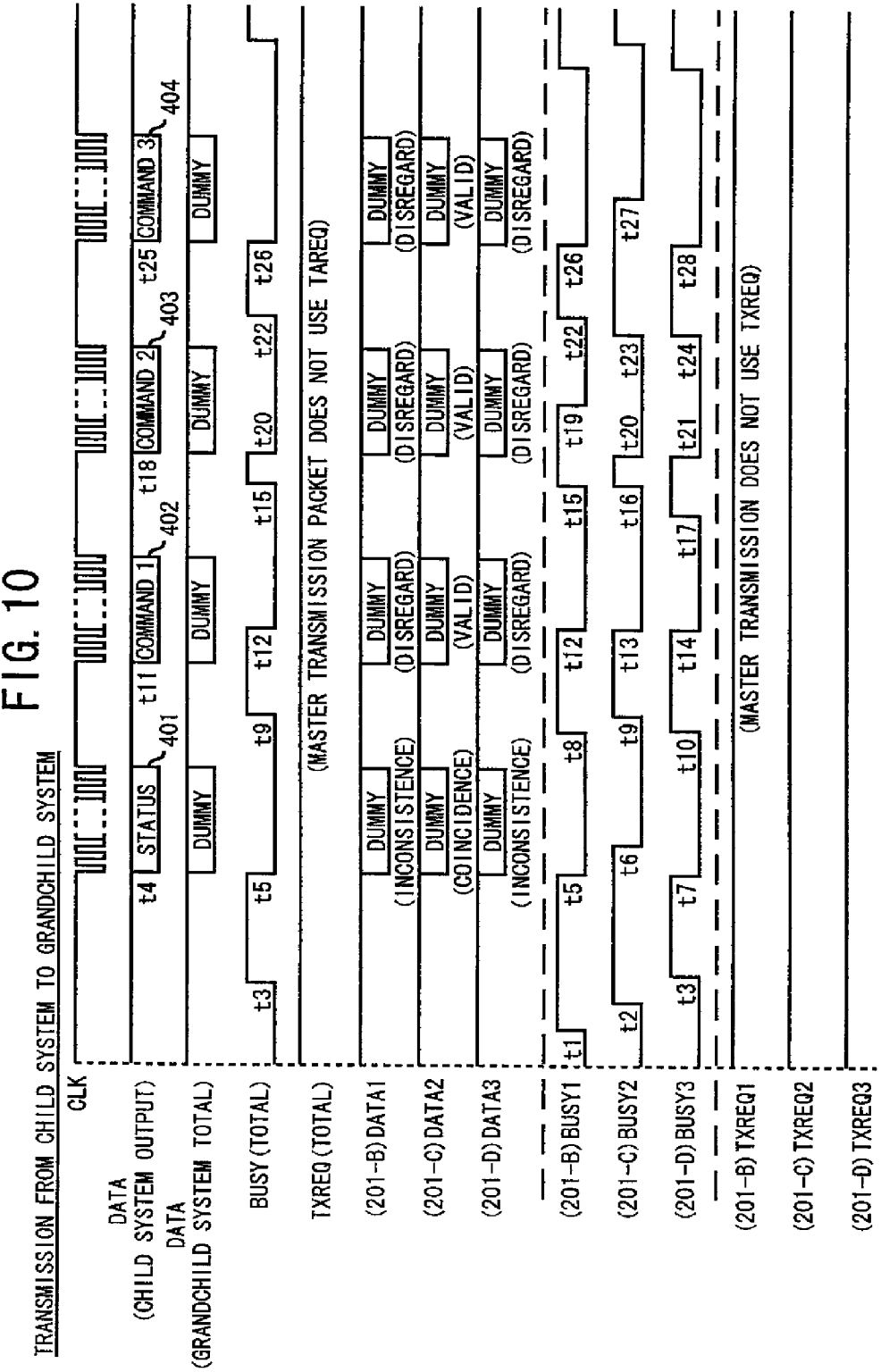

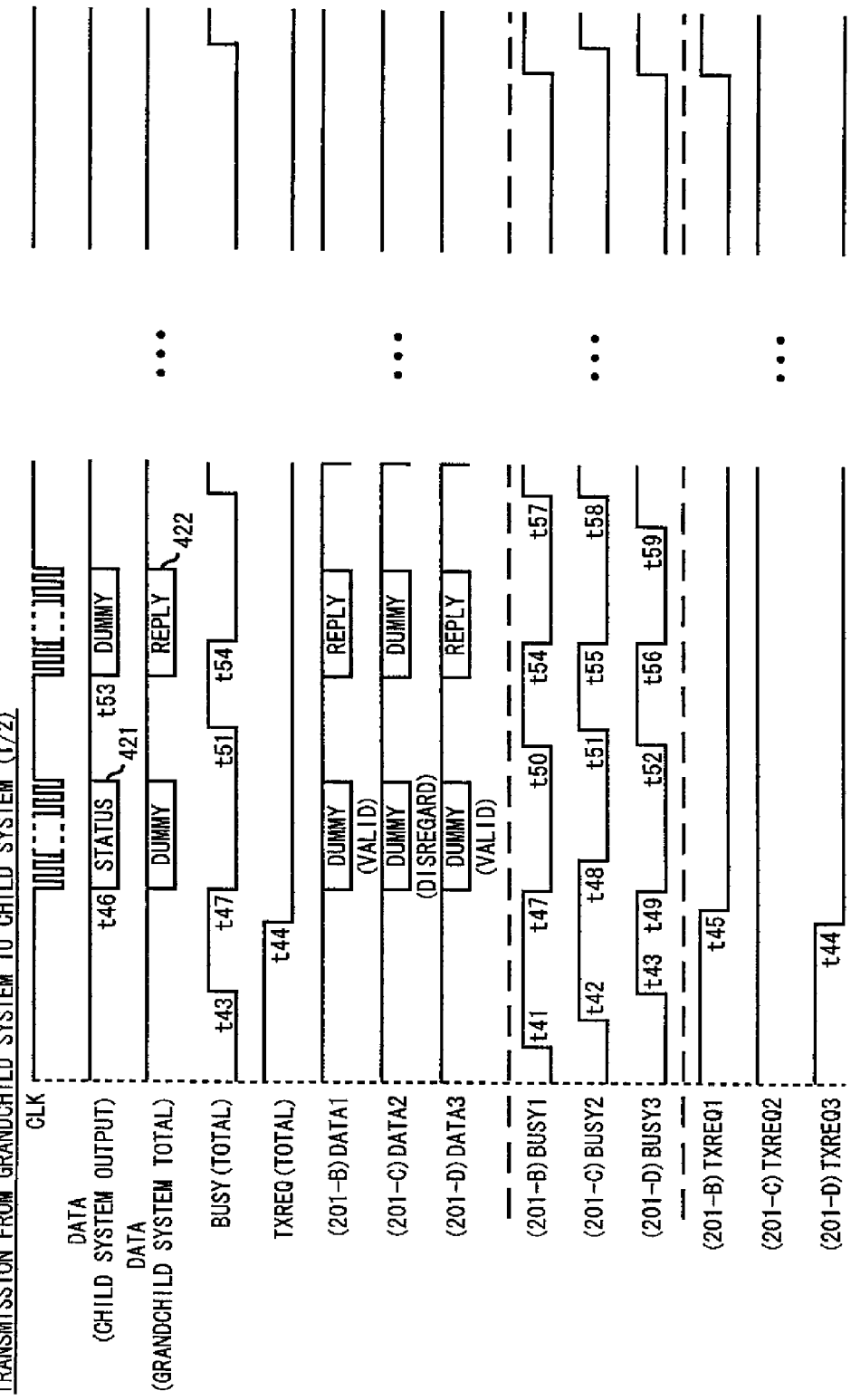

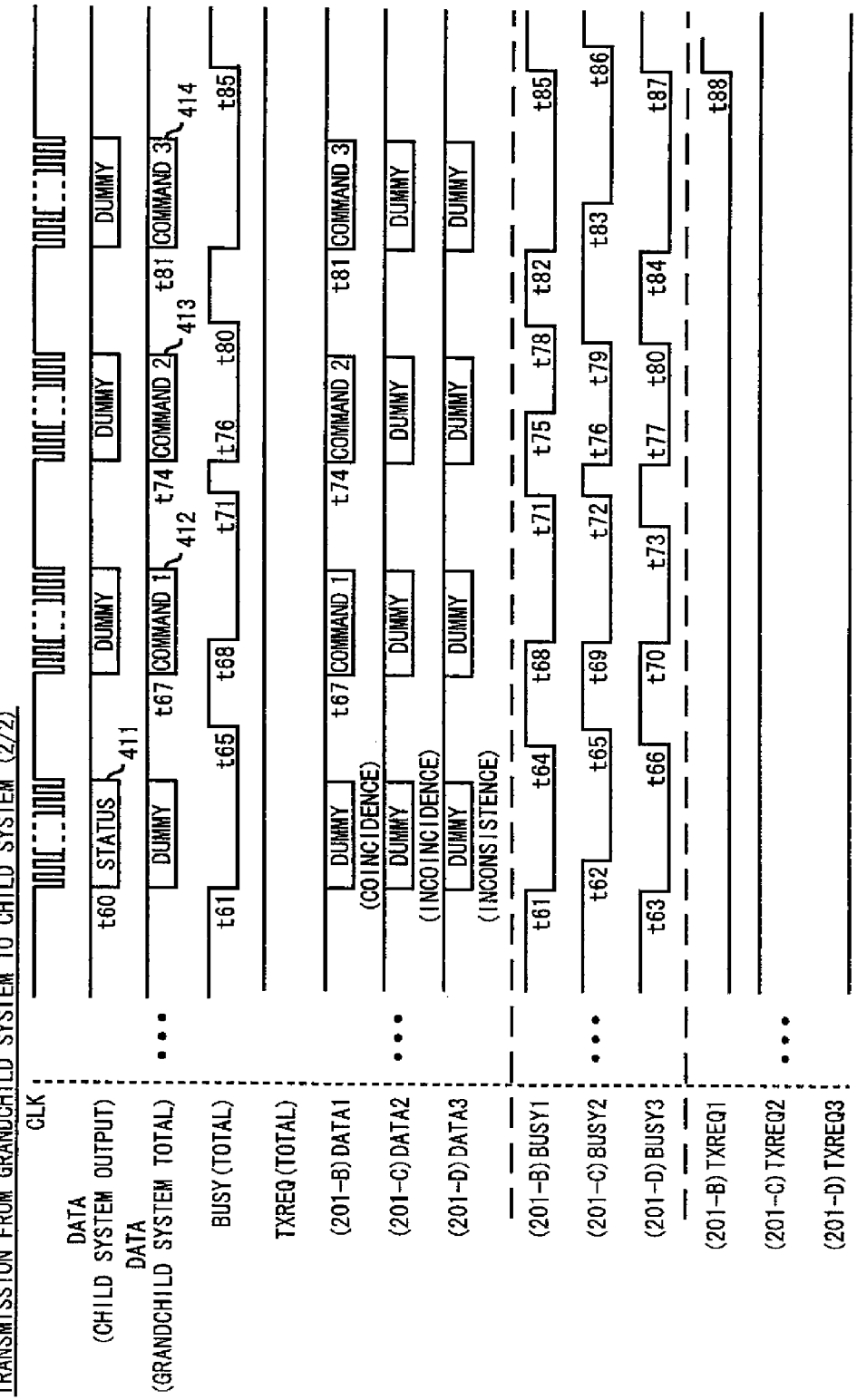

CONTROL SYSTEM AND COMMUNICATION SYSTEM FOR DIGITAL MIXER

CROSS-REFERENCE TO RELATED APPLICATIONS

This application is a continuation of U.S. patent application Ser. No. 11/377,126, filed Mar. 15, 2006, the entire disclosure of which is incorporated herein by reference.

BACKGROUND OF THE INVENTION

1. Technical Field of the Invention

The present invention relates to a control system and a communication system capable of being properly used to control a digital mixer or the like.

2. Description of the Related Art

Conventionally, a serial bus (i.e., an $I^2C$ bus) for enabling a plurality of devices to communicate with each other via two signal lines has been well known to those skilled in the art. A specific bus (i.e., an E-bus) formed by applying the $I^2C$ bus to data communication between internal devices (e.g., a keyboard, a panel operator, an indicator, and a sound source, etc.) contained in an electronic musical instrument has been disclosed in Japanese Patent Laid-open Publication No. 2002-251183 and corresponding U.S. Pat. No. 6,700,050. A plurality of addresses from 1 to 127 are assigned to individual devices for use in the $I^2C$ bus, respectively. Therefore, a maximum of 127 devices can be theoretically connected to the $I^2C$ bus.

However, in fact, if the number of $I^2C$ devices is increased, a buffer-amplifier called a repeater should be inserted into several points of the $I^2C$ bus. Therefore, the number of repeaters for use in an apparatus composed of a plurality of devices is also increased, resulting in increased costs of production. Specifically, the digital mixer includes more numbers of operators and indicators. than those of the electronic musical instruments, such that it has a disadvantage in that it must unavoidably increase the number of devices on the $I^2C$ bus.

Each device connected to the $I^2C$ bus requires a bus interface for connection to the bus. In order to transmit data from the bus interface to other devices, the device requires a specific function for designating individual addresses of source and destination devices. For example, the bus interface is more complicated than a serial communication interface such as an RS232C.

SUMMARY OF THE INVENTION

The present invention has been made in view of the above problems, and it is an object of the present invention to provide a control system and a communication system for reducing the number of devices connected to a complicated serial bus (e.g., $I^2C$ bus), and at the same time implementing communication between several devices.

In order to solve the above problems, the present invention is characterized by a configuration described below. In accordance with a first aspect of the present invention, the above and other objects can be accomplished by the provision of a control system comprising: a first class bus provided for transmitting data in a serial form; a plurality of first class devices connected to the first class bus, each first class device having a unique address, each first class device transmitting and receiving a first class packet including a source address and a destination address in terms of the unique addresses via the first class bus, thereby establishing mutual data communication among the first class devices; a plurality of second class buses provided in association with at least some of the first class devices, each second class bus being connected to each first class device separately from other first class device; a plurality of second class devices connected to the second class buses; a controllable element of a first type which is directly controlled by the first class device without using the second class device; a plurality of controllable elements of a second type which is controlled by the second class device; an element type determination section contained in each of the first class devices, for receiving from the first class bus a first class packet which includes identification information for identifying a controllable element and control data for specifying control content associated with the identified controllable element, the element type determination section determining whether the identified controllable element is the first type or the second type on the basis of the identification information included in the received first class packet; a first setup section contained in each of the first class devices for establishing a state of the controllable element of the first type on the basis of the control data when the element type determination section determines that the identified controllable element is the first type; a second class packet transmitter contained in each of the first class devices for transmitting a second class packet via the second class bus to a target second class device via the second class bus when the element type determination section determines that the identified controllable element is the second type, the second class packet being composed of designation information for designating the target second class device, the identification information and the control data; a self-designation determination section contained in each of the second class devices for determining whether each second class device is designated as the target second class device by the second class packet and therefore the second class packet is capable of controlling a controllable element of the second type by the target second class device; a second setup section contained in each of the second class devices for establishing a state of the controllable element of the second type on the basis of the control data in the second class packet when the self-designation determination section determines that the second class packet designates the concerned second class device as the target second class device; a second class data transmitter contained in each of the second class devices for detecting a manipulation of the controllable element of the second type belonging to the concerned second class device, and outputting second class data via the second class bus, the second class data being composed of identification information identifying the controllable element and control data indicating the detected manipulation of the controllable element; and a first class packet transmitter contained in each of the first class devices for transmitting a first class packet via the first class bus, the first class packet containing the second class data received from the second class bus and a source address and a destination addresses of the first class packet in terms of the unique addresses of the first class devices.

Preferably, the inventive control system further comprises a second class packet inspection section contained in each of the second class devices, for determining whether the second class packet is normally outputted without an error to the second class bus even when the self-designation determination section determines that the second class packet does not designates the concerned second class device as the target second class device.

Preferably, the controllable elements are previously allotted with respective port numbers, and the element type determination section determines the type of the controllable element according to the port number contained in the identification information in the received first class packet.

Preferably, the controllable elements are previously allotted with respective port numbers, and the second class packet transmitter generates the designation information according to the port number of the controllable element contained in the identification information in the received first class packet.

Preferably, the plurality of the controllable elements include a control manually operable for manipulation and an indicator controllable to indicate the state of the control.

Preferably, the second class bus contains an interrupt line connecting between the first class device and the plurality of the second class devices, such that each second class device can send a request signal to the first class device through the interrupt line for requesting transmission of the second class data at initiative of the second class device.

Preferably, the inventive control system is used for controlling a digital mixer which is composed of a parent device, a plurality of child devices connected as the first class device to the parent device through the first class bus, and a plurality of grandchild devices connected as the second class device to at least one of the child devices through the second class bus.

In accordance with a second aspect of the present invention, the above and other objects can be accomplished by the provision of a communication system including a master device and a plurality of slave devices for transmitting data in a serial form to the master device and receiving data in a serial form from the master device, the inventive communication system comprising: a first connection line provided for connecting a data output terminal of the master device in parallel to respective data input terminals of the slave devices; a second connection line provided for connecting a data input terminal of the master device in parallel to respective data output terminals of the slave devices; a status information transmitter contained in the master device, for outputting both of address information and status information via the first communication line, the address information specifying one of the slave devices and the status information including a communication direction flag indicating whether the master device receives or transmits data; a master data transmitter contained in the master device, for transmitting data to the specified slave device subsequent to the status information via the first connection line, if the communication direction flag indicating that the master device transmits data is transmitted by the status transmission transmitter; and a slave data transmitter contained in the respective slave devices, for transmitting the data to the master device via the second connection line subsequently to the status information, if the communication direction flag indicating that the master device receives data is transmitted by the status transmission transmitter and the concerned slave device is specified by the address information.

Preferably, the status information transmitter generates the status information including an error check code which is changed according to a predetermined rule whenever the status information is generated, the communication system further comprising an error check code verifier contained in each slave device, for verifying the error check code irrespective of whether the address information specifies the concerned slave device or other slave device.

Preferably, the inventive communication system further comprises: a third connection line provided for transmitting a transmission request signal from each slave device to the master device; a transmission request section contained in each slave device, for outputting the transmission request signal via the third connection line when transmission of data is required by each slave device; and a slave device determination section contained in the master device, for determining one or more of the slave device which has transmitted the transmission request signal to a target slave device such that address information of the target slave device is generated together with the status information.

Preferably, the inventive communication system is used for controlling a digital mixer which is composed of a parent device, a plurality of child devices connected as the master device to the parent device through the first connection line, and a plurality of grandchild devices connected as the slave device to at least one of the child devices through the second connection line.

In this manner, according to the inventive control system in which each of the first class devices is connected via the first class bus, and each second class device is connected to the first class device via the second class bus, the number of the first class devices, which require a specific function for adding source and destination addresses to data, can be reduced by the number of the second class devices. Moreover, the second class device which does not require the specific function for adding source and destination addresses to data input/output operations is cheaper than the first class device, resulting in the implementation of simplified configuration and reduced production costs.

In this way, according to the communication system of the present invention, the status information transmitter contained in the master device transmits status information including a communication direction flag, one of the master data transmitter and the slave data transmitter transmits data, and data communication begins after a device that must transmit data is determined by the master device. For example, the present invention prevents data collision which would be caused by simultaneous data transmission by a plurality of devices, resulting in increased reliability of data communication. In addition, there is no need to perform an arbitration process when data collision occurs, resulting in reduction of system costs.

Further according to the present invention, each slave device can verify the error check code irrespective of whether each slave device is designated as a communication party, such that the slave device directly unconcerned with data communication is able to serve as a check device, and resources of the slave device are effectively used, resulting in increased system reliability.

Moreover according to the present invention, each slave device outputs a transmission request signal to the master device via the third connection line, such that it can quickly inform the master device of the transmission request without generating a communication failure between the master device and other slave devices than the above-mentioned slave device.

BRIEF DESCRIPTION OF THE DRAWINGS

FIG. 7 shows packet configuration of the E-bus system.

FIG. 10 is a timing diagram of the S-bus system.

FIG. 11 is a timing diagram of the S-bus system.

FIG. 12 is a timing diagram of the S-bus system.

DETAILED DESCRIPTION OF THE INVENTION

1. Hardware Configuration of Embodiment 1.1 Operation Panel (100) Configuration

Figure 1:
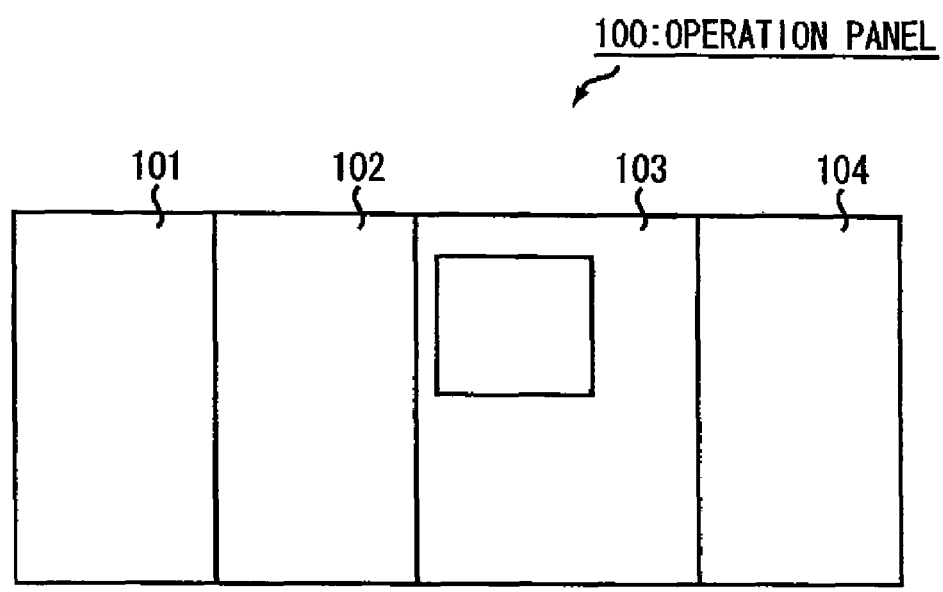
FIG. 1 is a plan view of the operation panel 100 of the digital mixer according to a preferred embodiment of the present invention.

The operation panel (100) for use in the digital mixer according to a preferred embodiment of the present invention will hereinafter be described with reference to FIG. 1. The operation panel 100 is composed of four sectors (i.e., sections 101~104). Each of the sections 101 and 102 includes a fader (or the like) for adjusting the volume of an input channel. Likewise, the section 104 includes a fader (or the like) for adjusting the volume of an output channel. The section 103 is adapted to establish detailed parameters for use in a single channel selected from among I/O channels. An audio signal equipped with adjusted volume- and sound quality-levels in individual input channels is outputted to a plurality of buses (i.e., a stereo bus, a MIX bus, and a CUE bus, etc.).

In this case, the stereo bus is indicative of a bus for mixing an audio signal capable of absorbing sound at guest seats. The MIX bus is indicative of a bus capable of implementing an auxiliary soundproof function and a recording function. The CUE bus is indicative of a bus for mixing an audio signal for use in a monitor in association with an operator of a digital mixer. Individual output channels are assigned to the above-mentioned buses, respectively. The level or the like of a mixed audio signal of each bus is controlled by the section 104, such that the controlled level is outputted to the outside.

Figure 2:
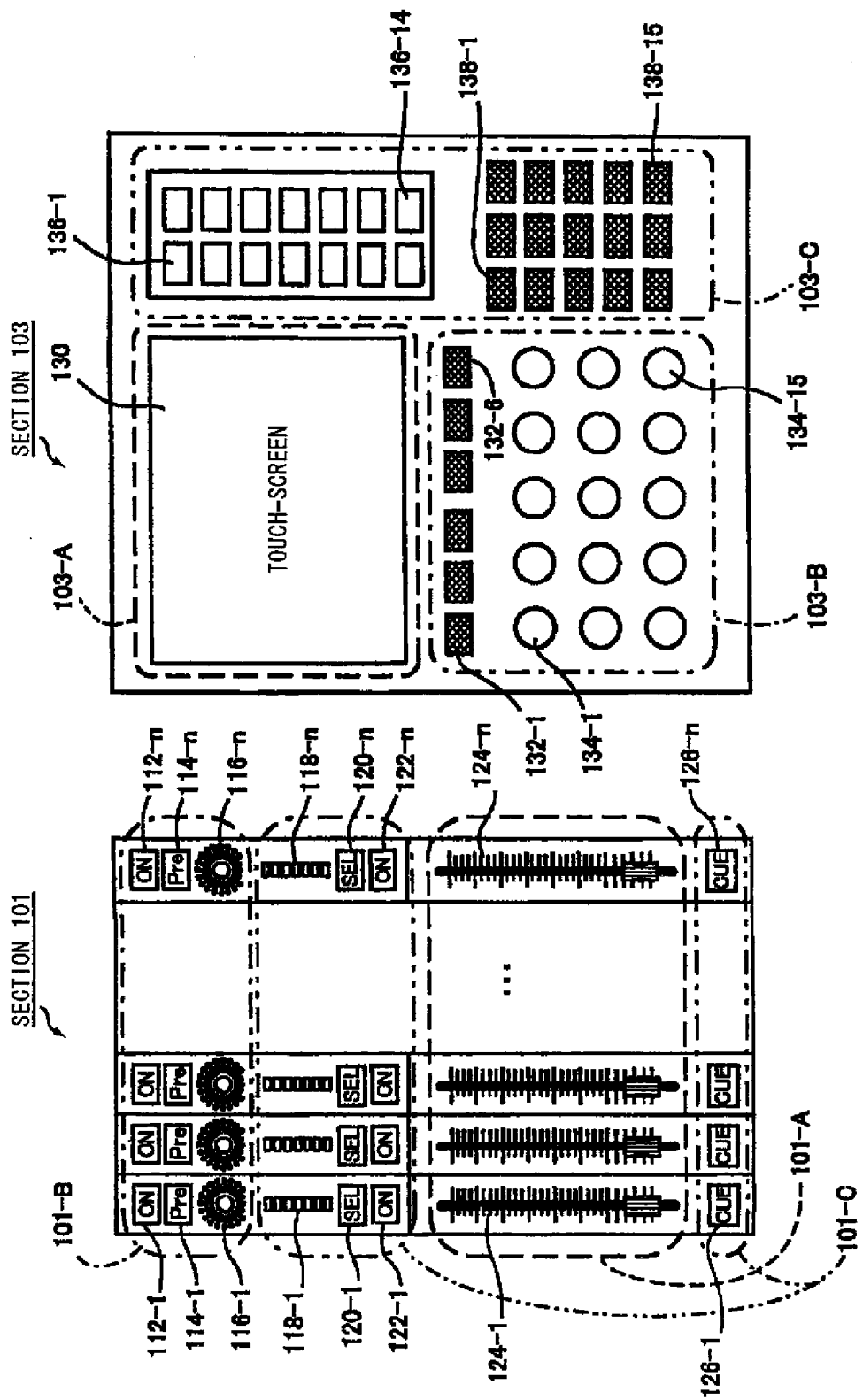
FIG. 2 is a plan view of sections 101 and 103 contained in the operation panel 100.

The sections 101 and 103 will hereinafter be described with reference to FIG. 2. The reference numbers 112-1~n contained in the section 101 are indicative of send on/off switches. Each send on/off switch determines whether a corresponding input channel is outputted to each MIX bus. The reference numbers 124-1~n are indicative of electric faders, and each electric fader is adapted to establish a gain of an audio signal of each input channel. The reference numbers 114-1~n are indicative of send-mode switches, and each send-mode switch selects either a first signal formed before the volume is adjusted by the electric faders 124-1~n or a second signal formed after the volume is adjusted by the electric faders 124-1~n, such that the selected signal is used as an audio signal transmitted from each input channel to each MIX bus. The reference numbers 116-1~n are indicative of rotary encoders, and each rotary encoder establishes a send level, etc. of a designated MIX bus. The reference numbers 118-1~n are indicative of LED indicator groups, and each LED indicator group indicators various states of each input channel using LED lighting on/off states.

The reference numbers 120-1~n are indicative of select switches, and each select switch selects a channel which must establish detailed parameters for use in the section 103. The reference numbers 122-1~n are indicative of on/off switches, and each on/off switch determines whether a corresponding input channel will be outputted to the stereo bus or the MIX bus. The reference numbers 126-1~n are indicative of CUE switches, and each CUE switch determines whether an audio signal of each input channel will be outputted to the CUE bus.

In this case, individual state of the above-mentioned switches, rotary encoders, and electric faders may also be automatically established by a control system (shown in the circuit of FIG. 3) contained in the digital mixer. Individual switches are indicative of key switches, each of which includes an LED. On/Off states of a parameter corresponding to the key switch are recognized by a control system. If the LED is turned on/off, on/off states of the parameter are indicated for operator's recognition. Therefore, if on/off states of a corresponding parameter are changed in the control system, and the LED is turned on/off according to the changed result, the on/off states of the parameter can be automatically established.

Each rotary encoder is infinitely rotated. If the operator rotates the rotary encoder, the rotary encoder is rotated by a predetermined section angle. Whenever the rotary encoder is rotated by the section angle, a pulse is outputted to the control system. Therefore, the control system counts the number of the above pulses, such that it can acquire a rotation angle of the rotary encoder before or after the operator rotates the rotary encoder. A variety of parameters (e.g., a send level associated with a designated MIX bus) are assigned to the rotary encoder, such that a corresponding send level of the control system is increased or reduced according to the rotation angle. Several tens of LEDs are circularly arranged in the vicinity of each rotary encoder, an approximation value of a corresponding parameter setup value is indicated on the LEDs. Therefore, if the control system changes a corresponding parameter value to another value, and establishes on/off states of the LEDs according to the changed result, the above-mentioned parameters can be automatically established.

If the electric fader is operated by the operator, a corresponding operation location is detected, and the detected operation location is recognized by the control system. Therefore, the control system establishes a parameter value (mainly, audio signal gain) according to the electric fader's operation location.

In the meantime, the above-mentioned parameter value is determined by a physical operation location of the electric fader. In order to automatically reproduce the above-mentioned parameter value on the panel, the electric fader requires a drive device such as a motor. In other words, if the parameter value is automatically established, the motor is driven by a command of the control system, and the physical operation location of the electric fader is established.

Individual operators of the section 101 are classified into three sub-sections 101-A, 101-B, and 101-C. The sub-section has a predetermined range capable of being controlled by a single low-priced CPU, and is formed by the section 101's division. Firstly, the sub-section 101-A includes electric faders 124-1~n. The sub-section 101-B includes on/off switches 112-1~n, send-mode switches 114-1~n, and rotary encoders 116-1~n. The sub-section 101-C includes LED indicator groups 118-1~n, select-switches 120-1~n, on/off switches 122-1~n, and CUE switches 126-1~n.

Although the detailed description of the section 101 has been disclosed above, the sections 102 and 104 are equal to the section 101, the section 102 is classified into three sub-sections 102-A, 102-B, and 102-C, and the section 104 is classified into sub-sections 104-A, 104-B, and 104-C.

The reference number 130 of the section 103 is indicative of a touch-screen. The touch-screen includes an indicator and a transparent touch-panel arranged on the indicator. If the operator pushes or presses the touch-panel using his or her finger or a writing pen, etc., the operator's touching on the touch-panel and coordinates of the user-touched location on the touch-panel are detected.

The reference numbers 132-1~132-6, 136-1~136-14, and 138-1~138-15 are indicative of switches, such that they are adapted to establish on/off states of various parameters according to a function assigned to the section 103.

The reference numbers 134-1~134-15 are indicative of rotary encoders. For example, the rotary encoders are adapted to adjust a send level ranging from individual input channels selected by the select switches 120-1~$n$ to each MIX bus. In the section 103, the touch-screen 130 constructs the sub-section 103-A, the switches 132-1~132-6 and the rotary encoders 134-1~134-15 construct the sub-section 103-B, and the switches 136-1~136-14 and 138-1~138-15 construct the sub-section 103-C.

1.2. Overall Configuration of Control System

Figure 3:
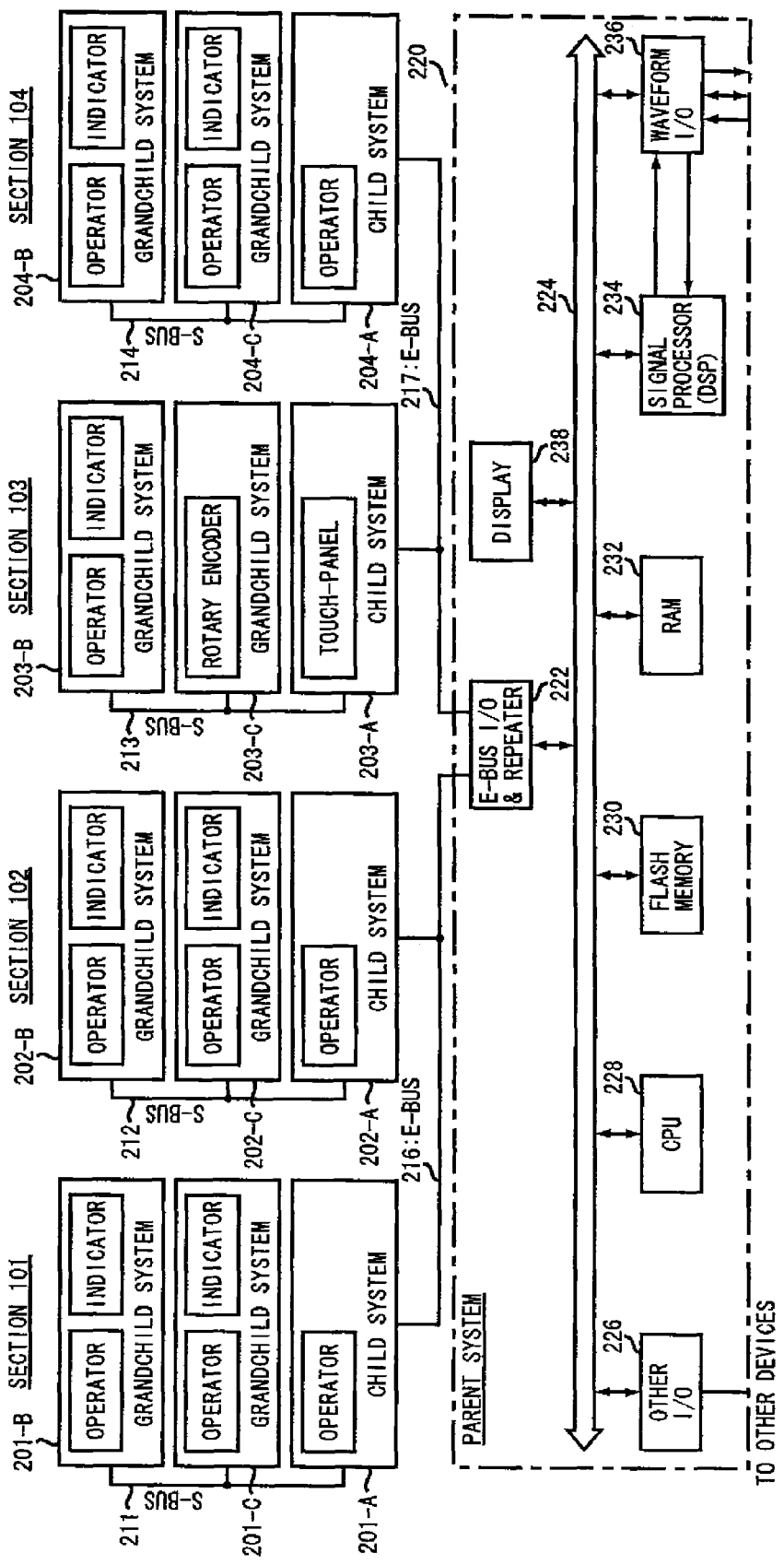
FIG. 3 is a block diagram illustrating a control system of the digital mixer according to a preferred embodiment of the present invention.

The control system for use in the digital mixer according to a preferred embodiment of the present invention will hereinafter be described with reference to FIG. 3.

The reference number 220 is indicative of a parent system for monitoring/controlling overall operations of the digital mixer. The reference numbers 201-A, 202-A, 203-A, and 204-A are indicative of child systems for monitoring/controlling individual sections 101~104, such that the child systems directly monitor/control the sub-sections 101-A, 102-A, 103-A, and 104-A. The reference numbers 201-B, 202-B, 203-B, 204-B, 201-C, 202-C, 203-C, and 204-C are indicative of grandchild systems for monitoring/controlling the sub-sections 101-B, 102-B, 103-B, 104-B, 101-C, 102-C, 103-C, and 104-C.

In more detail, the parent system 220 is indicative of a system substrate equipped with 2 E-bus connectors based on the $I^2C$ bus. Each child system is indicative of a system substrate including an E-bus connector and an S-bus connector for two-way serial communication. Each grandchild system is indicative of a system substrate including a single S-bus connector. The reference numbers 216 and 217 are indicative of E-bus cables. The E-bus cables are connected to the parent system 220 and the E-bus connectors of the child systems 201-A~204-A, such that signal transmission is performed between the patent system 220 and the child systems 201-A~204-A. The reference numbers 211~214 are indicative of S-buses. The S-buses are connected to individual child systems and S-bus connectors of grandchild systems under the child systems, such that signal transmission is performed between the child and grandchild systems.

In the parent system 220, the reference number 222 is indicative of an E-bus I/O section. The E-bus I/O section 222 inputs or outputs signals to the E-buses 216 and 217, and acts as a repeater for the E-buses 216 and 217. The reference number 224 is indicative of a CPU bus connected to individual components of the parent system 220. The reference number 234 is indicative of a signal processor, and performs a variety of signal processes (e.g., echoing, mixing, and level adjusting, etc.) of digital audio signal. The above-mentioned stereo bus and the MIX bus, etc. are executed by an algorithm processed by the signal processor 234. The reference number 236 is indicative of a waveform I/O section. The waveform I/O section converts a multi-channel analog- or digital-signal received from an external part into a digital signal based on an internal format of the parent system 220, transmits the converted digital signal to the signal processor 234, and at the same time converts a digital signal received from the signal processor 234 into an analog signal or a digital signal based on an external format.

The reference number 226 is indicative of other I/O sections connected to an external controller for controlling the digital mixer at a remote site. The reference number 228 is indicative of a CPU for controlling individual components of the parent system 220 on the basis of a program stored in the flash memory 230. The reference number 232 is indicative of a RAM used as a work memory for the CPU 228. The reference number 238 is indicative of an indicator acting as a part of the above-mentioned touch-screen 130.

1.3. Configurations of Child System and Grandchild System

Figure 4A:
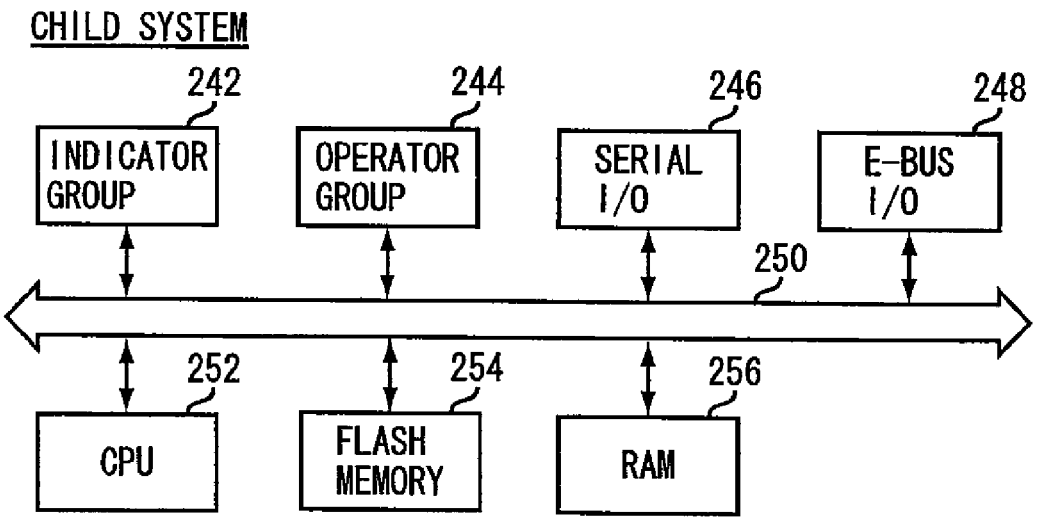
FIGS. 4(*a*) and 4(*b*) are a block diagram of the child and grandchild systems.

A general structure of the child system will hereinafter be described with reference to FIG. 4a. In FIG. 4a, the reference number 242 is indicative of an indicator group composed of a variety of LEDs. However, in accordance with the preferred embodiment of the present invention, there is no indicator group 242 in the sub-sections 101-A and 103-A directly controlled by the child system. The reference number 244 is indicative of an operator group. In more detail, the electric fader 124-1~$n$ of the sub-section 101-A corresponds to the operator group 244, and a touch-panel of the touch-screen 130 in the sub-section 103-A corresponds to the operator group 244. The reference number 246 is indicative of a serial I/O section, such that the serial I/O section performs signal I/O operations between the child system and the grandchild system via the S-bus. The reference number 248 is indicative of an E-bus I/O section, such that the E-bus I/O section inputs or outputs various signals to the parent system via the E-bus. The reference number 252 is indicative of a CPU, such that the CPU controls individual components contained in the child system on the basis of a program stored in the flash memory 254. The reference number 256 is indicative of a RAM used as a work memory of the CPU 252.

Figure 4B:
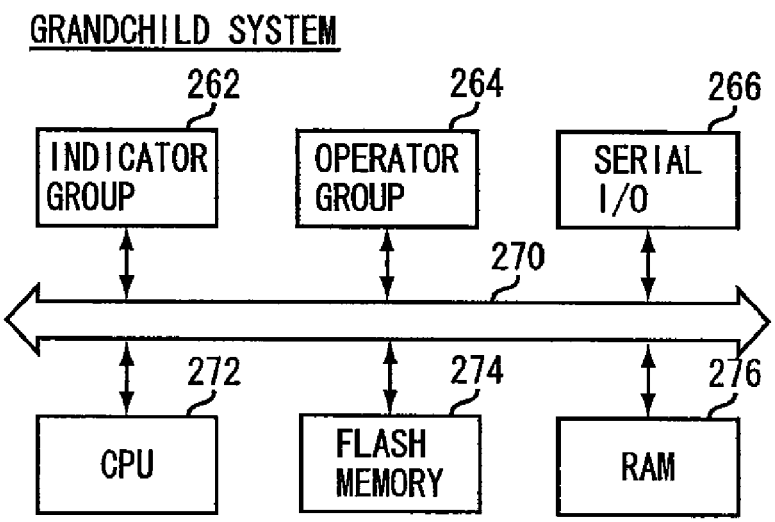

A general structure of the grandchild system will hereinafter be described with reference to FIG. 4b. In FIG. 4b, the reference number 262 is indicative of an indicator group composed of a variety of LEDs (e.g., a single LED, an LED contained in a switch, and an LED located in the vicinity of the rotary encoder). The reference number 264 is indicative of an operator group including various switches and rotary encoders, etc. The reference number 266 is indicative of a serial I/O section, such that the serial I/O section performs signal I/O operations between the grandchild system and the child system via the S-bus. The reference number 272 is indicative of a CPU, such that the CPU 272 controls individual components contained in the grandchild system on the basis of a program stored in the flash memory 274. The reference number 276 is indicative of a RAM used as a work memory of the CPU 272.

Figure 5:
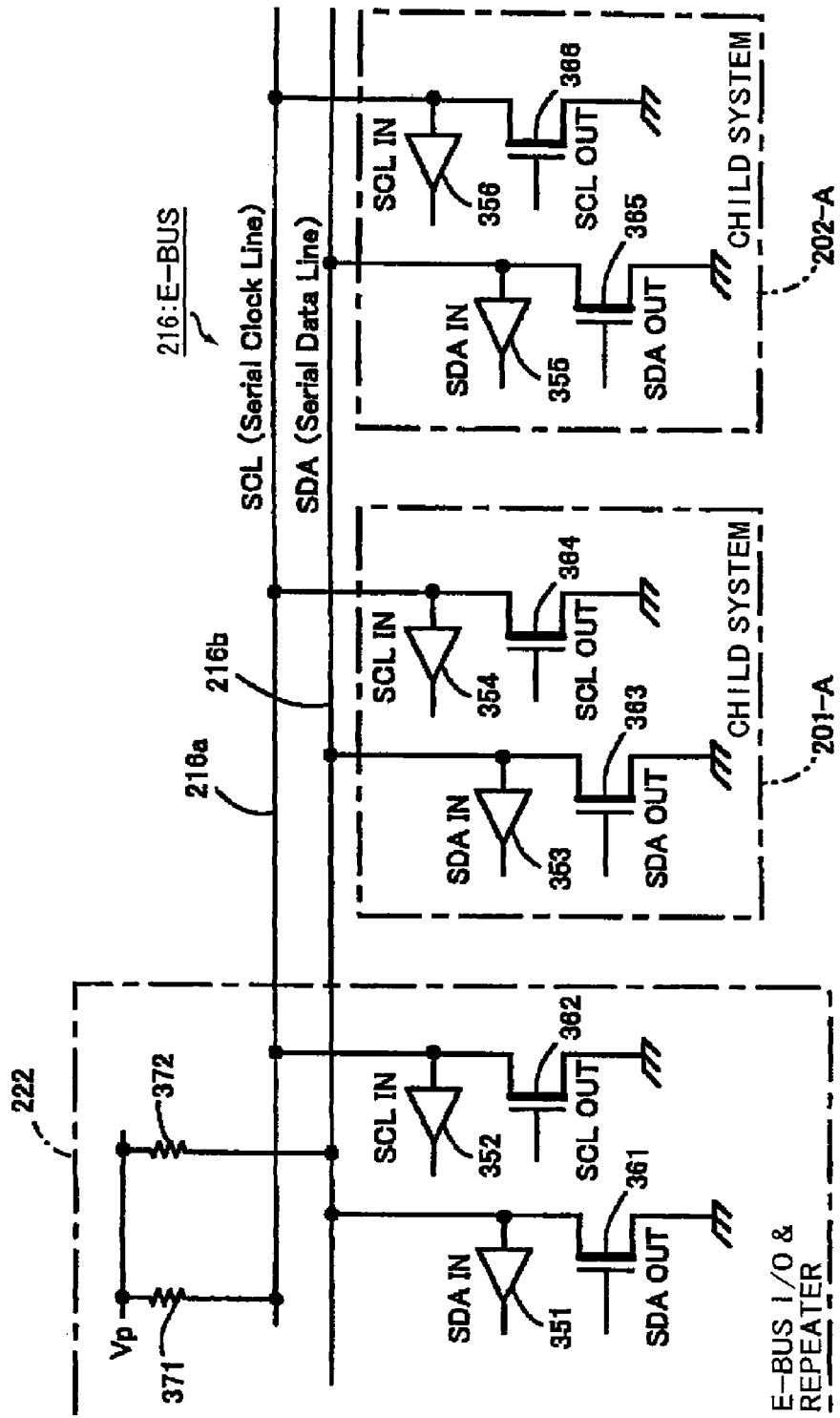
FIG. 5 is a circuit diagram illustrating an E-bus system.

2. Communication Protocol for use in Preferred Embodiment 2.1. E-Bus Protocol 2.1.1. Physical Configuration E-buses 216 and 217 connected between the parent system 220 and the child systems 201-A to 204-A will hereinafter be described. A detailed description of the E-bus 216 is shown in FIG. 5. It should be noted that only two signal lines 216a and 216b from among 7 wires contained in the E-bus 216 (i.e., $I^2C$ bus) are shown in FIG. 5. The reference number 216a is indicative of an SCL line for transmitting a clock signal SC1. The reference number 216b is indicative of an SDA line for transmitting a data signal SDA. The remaining five signal lines not shown in FIG. 5 are a single initial clear line and four power lines. The reference numbers 371 and 372 contained in the E-bus I/O section 222 of the parent system 220 are indicative of pull-up resistors for implementing the pull-up of the SCL line 216a and the SDA line 216b, such that each of the SCL line 216a and the SDA line 216b is pulled up to a predetermined voltage Vp.

The reference numbers 361 and 362 are indicative of FETs (Field Effect Transistors, hereinafter referred to as a transistor). The FETs 361 and 362 are connected to open drain terminals of the lines 216a and 216b, respectively. Provided that only the E-bus I/O section 222 is connected to the E-bus 216, if the transistors 361 and 362 are switched on, the clock signal SCL and the data signal SDA approximate to a value around a ground level. If the transistors 361 and 362 are switched off, individual signals SCL and SDA have values around the ground level. In this case, a specific value between the ground level and the intermediate point of the voltage Vp is determined to be a threshold value. A voltage less than the threshold value is set to a logic value "0", and a voltage equal to or higher than the threshold value is set to a logic value "1". The reference numbers 351 and 352 are indicative of buffers, such that the buffers 351 and 352 detect logic values of individual signals SCL and SDA.

Therefore, the E-bus I/O section 222 turns on or off the transistors 361 and 362, such that it can transmit the clock signal SCL and the data signal SDA via the SCL line 216a and the SDA line 216b, respectively. Moreover, the E-bus I/O section 222 can receive signals SCL and SDA of individual lines 216a and 216b via the buffers 351 and 352, respectively. In this way, the child systems 201-A and 202-A include transistors 363-364 and 365-366 connected to open drain terminals of individual lines 216a and 216b; and buffers 353-354 and 355-356 for detecting logic values of individual lines 216a and 216b. If any one of the transistors connected to individual lines is turned on, a signal of a corresponding line is set to the logic value "0", such that the transistors are configured in the form of an AND circuit with individual lines 216a and 216b. Although the E-bus 216 has been disclosed above, it should be noted that the E-bus 217 is equal to the E-bus 216. The E-buses 216 and 217 are interconnected via a repeater contained in the E-bus I/O section 222.

2.1.2. Packet Format

Figure 6:
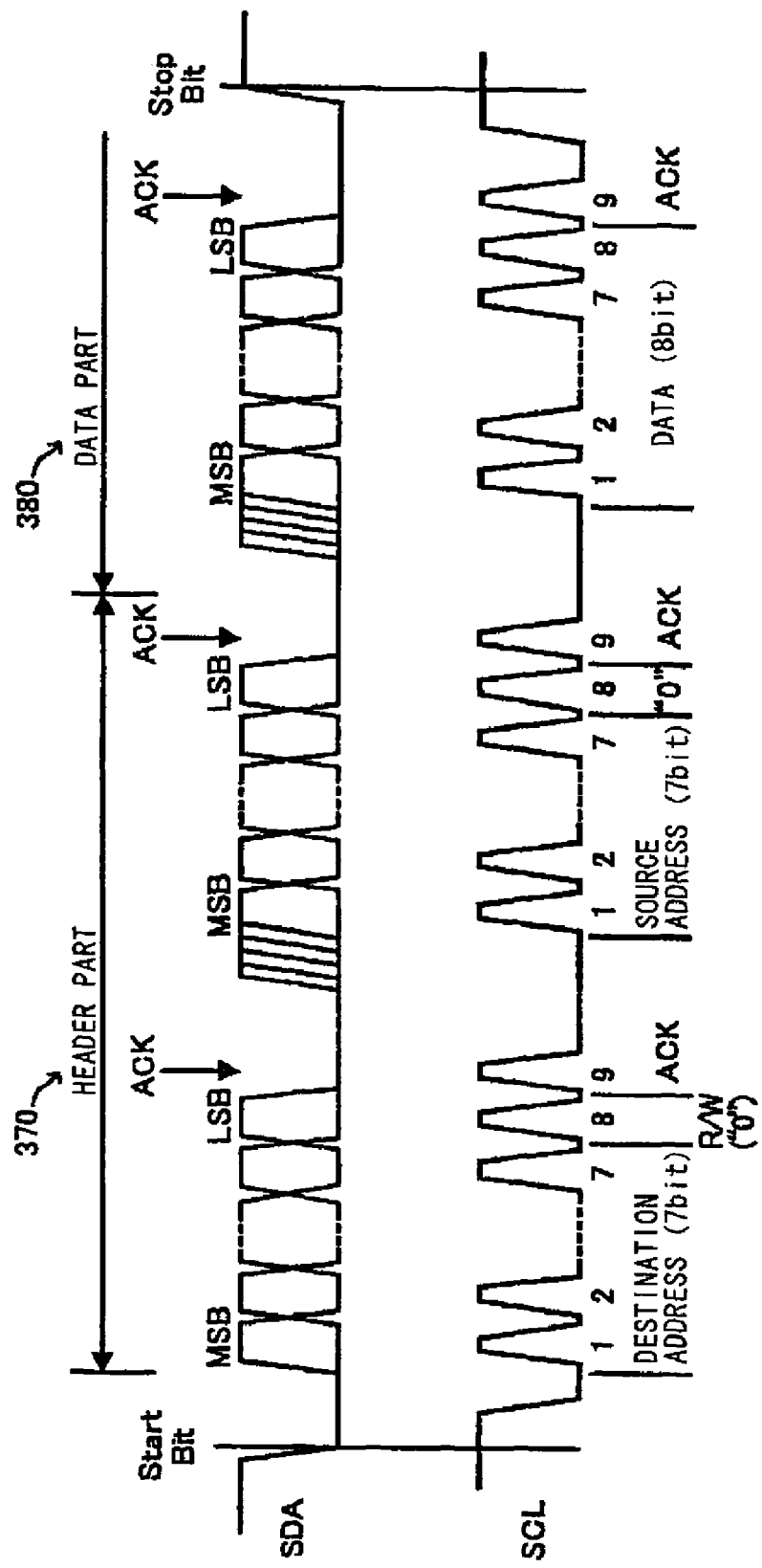
FIG. 6 is a timing diagram of the E-bus system.

A timing chart for data transmission in the SCL line 216a and the SDA line 216b are shown in FIG. 6. The E-bus system can perform data transmission only when the bus is in an open state (i.e., "1"). The device which desires to transmit data via the E-bus from among a plurality of devices (i.e., the parent system or the child system) connected to the E-bus outputs the logic value "0" as the data signal SDA when individual signals SCA and SDA are all set to the logic value "1". In this case, the logic value "0" generated from the device is referred to as a Start Bit. By the start bit, a specific state in which data is to be outputted to the E-bus is detected from other devices.

Transmission/reception of the data signal SDA of 1 byte section (i.e., 8-bits section) is established between individual devices connected to the E-bus. The clock signal SCL is generated from a source device, such that it is descended at a timing point at which individual bits of the data signal SDA are stabilized. If transmission of the data signal SDA having the 1 byte is completed, the source device generates a 1-bit clock pulse signal (ACK) for confirmation. At the output timing point of the above-mentioned ACK signal, the source device outputs the logic value "1" as the data signal SDA. In this case, if the destination device for receiving data from the source device receives normal data, it outputs the logic value "0" as the data signal SDA. If an AND operation is performed on the above-mentioned signals, the data signal SDA appearing on the SDA line 216b becomes the logic value "0", such that the source device can determine whether the destination device normally receives the data signal SDA.

A unique address of 7 bits is assigned to each device. The source device initially outputs a destination address of 7 bits and a bit called a R/W bit after outputting the start bit. In accordance with the preferred embodiment of the present invention, the R/W bit is always set to "0" (Write). Thereafter, the source address of 7 bits and a dummy signal of "0" are generated. A packet header part 370 is configured by 2 bytes. A data part 370 composed of a single byte or several bytes is transmitted from the source device. In accordance with the preferred embodiment of the present invention, the data part 380 always has the length of 3 bytes. Individual bytes contained in the data part 380 are called first data, second data, and third data.

A device name and an address name for use in the preferred embodiment of the present invention, and the relationship between the I²C standard and the above-mentioned names will hereinafter be described. In accordance with the preferred embodiment of the present invention, the source address is called a master address according to the I²C standard, the source device is called a master device. The destination address is called a slave address according to the I²C standard, the destination device is called a slave device. The master device begins a communication mode, and at the same time outputs a clock signal SCL to the SCL line 216a. It should be noted that the master device is not limited to the device for transmitting the data part 380, and is applicable to other examples.

In other words, if the above-mentioned R/W bit is set to "0" (write), the data part 380 is generated from the master device, and the slave device receives the data part 380 from the master device. If the R/W bit is set to "1" (Read), the data part 380 is generated from the slave device, and the master device receives the data part 380 from the slave device. However, the digital mixer according to the present invention requires real-time characteristics. Therefore, if there is a need to transmit data from a single device A to another device B, the device A is used as a master device. As a result, in accordance with the preferred embodiment of the present invention, the R/W bit generated from the master device is always set to "0", and the master device based on the I²C standard is called the source device, and the slave device is called the destination device.

A detailed description of an arbitration operation will hereinafter be described. In the E-bus system, individual devices can begin data transmission only when the bus is open (i.e., H-level). A plurality of devices acting as source devices may attempt to initiate data transmission almost simultaneously. In this case, an arbitration operation for permitting data communication of only one device is performed. For the arbitration operation, an AND access state between the SDA line and transistors of the data output section of each device is used. In more detail, if data transmission begins, the destination address following the start bit is outputted to the SDA line 216b. In a plurality of devices which attempt to transmit data, an address received from the SDA line is compared with a destination address specified by the devices one bit at a time. In this case, if the devices simultaneously output data to the SDA line 216b, the data is AND-processed, such that the SDA line remains in the logic value "0" when any device outputs the logic value "0".

As a result, the bit received from the SDA line 216b becomes "0" whereas the bit contrasting with the destination address specified by the device is set to "1". In this way, if an inconsistent address occurs, it is determined that other devices have higher priority, such that the output of data is turned off. If destination addresses generated from the above-mentioned devices are identical with each other, individual devices have different source addresses, such that the output of data of other devices other than a single device is always turned off.

Address configuration of the above-mentioned devices will hereinafter be described. Each device address is composed of 7 bits. The upper 4-bits of the device address composed of 7 bits are called a category ID indicative of device category information.

For example, it is desirable that the category ID of the parent system 220 is set to "0010b" (where b is a binary number), and the category ID of the child system is set to "0010b". In addition, the lower 3-bits of the address are called a sub-address, and unique numbers ranging from "000b" to "111b" are assigned to the lower 3-bits. In the case of the above-mentioned arbitration operation, the greater the number of successive "0"s located at the head part of the destination address, the faster the data transmission to the destination device. Therefore, it is desirable that the category ID is determined according to the priority of data transmission.

2.1.3. Packet Category (1) Protocol Types

The E-bus system disclosed in Japanese Patent Laid-open Publication No 2002-251183 has been developed to establish interconnection of internal devices of the electronic musical instrument. The standard protocol, the MIDI protocol, and the common protocol have been defined in the electronic musical instrument. The standard protocol is adapted to input/output operation states of various switches, a JOG controller, and a continuance controller, etc. The MIDI protocol performs I/O operations of the MIDI signal. The common protocol transmits a command such as an initialization process of each device. Individual devices (other than the parent system 220 in the preferred embodiment) are designed to input/output only one of packets of the standard protocol and packets of the MIDI protocol.

The category ID determines which one of the standard protocol and the MIDI protocol is handled by each device. In more detail, according to the above-mentioned Japanese Patent Laid-open Publication No. 2002-251183, the MIDI protocol is applied to the device having the category ID of "0101b". However, it should be noted that each device can perform I/O operations of a common protocol packet, regardless of category ID. Since the preferred embodiment of the present invention does not consider a method for transmitting the MIDI signal via the E-bus, only two protocols (i.e., the standard protocol and the common protocol) are applied to the preferred embodiment. In more detail, all devices perform packet I/O operations of the common protocol and the standard protocol.

(2) Common Protocol

Packet configuration of the common protocol and the standard protocol will hereinafter be described with reference to FIG. 7.

When the E-bus system is driven, a packet of "C01:E-bus start" is transmitted from the parent system 220 to individual child systems 201-A~204-A. In the packet of "C01:E-bus start", the destination address is indicative of an address of each child system, and the source address is indicative of an address of the parent system.

First data of the data part 380 is set to "01h" (where h is a hexadecimal number), second data is set to "00h", and third data is set to "00h". If the above-mentioned packet is received, each child system prepares an I/O process associated with the E-bus. However, when transmitting the above-mentioned E-bus start packet, a specific transmission method called a general call method may be used. According to the general call method, the destination address is set to "0000000b", and the packet is simultaneously transmitted to other devices. If the E-bus start packet is transmitted according to the above-mentioned general call method, all child systems can be initialized by only one transmission.

The parent system 220 transmits a packet of "C02:Category ID•Sub-address•Request" to individual child systems. The packet "C02:Category ID•Sub-address•Request" requests individual child systems to report the category ID and the sub-address. The general call method may also be used for the above-mentioned packet. The parent system 220 has basically recognized the child system connected to the E-buses 216 and 217, such that the above-mentioned packet "C02:Category ID•Sub-address•Request" is mainly used to determine whether each child system is normally operated.

If the "C02:Category ID•Sub-address•Request" packet is received in each child system, a packet of "C03:Category ID•Sub-address•Reply" is transmitted from the child system to the parent system 220.

In the "C03: Category ID•Sub-address•Reply" packet, the destination address is indicative of an address of the parent system, and the source address is indicative of an address of the child system transmitting the corresponding packet. In the case of the above-mentioned packet, first data is set to "00h", second data is set to a category ID of the child system, and third data is set to a sub-address of the child system. In addition, if the I/O operation of specific information (e.g., an error report, etc.) is performed between the parent system 220 and the child system, a packet of "C04:Others" is used for the I/O operation of the specific information. First data of the packet ranges from "00h" to "0Fh", and second and third data is indicative of parameters based on the I/O information.

(3) Standard Protocol (3.1) Data Transmission from Child system to Parent system Packets for data transmission from the child system to the parent system will hereinafter be described. In the above packets, the destination address always corresponds to the parent system 220, and the source address is indicative of an address of the child system transmitting the corresponding packet. If any switch of the child system (or the grandchild system under the child system) is switched off, the above-mentioned switch-off state is reported from the child system to the parent system 220 by the packet "C11:SW OFF". In the above-mentioned packet, first data is set to "6xh" (where x is a port number from "0h" to "Fh", second data is indicative of a switch number ranging from "00h" to "FFh", and third data is set to dummy data "00h".

In this way, if any switch is switched on, the switch-on state is reported from the child system to the parent system 220 by the packet "C12:SW ON". In the above-mentioned packet, first data is set to "7xh", second data is indicative of a switch number from "00h" to "FFh", and third data is indicative of dummy data of "00h".

In this way, in the above-mentioned "SW ON/OFF" packet, a maximum of the port numbers is set to 16, a maximum of 256 switch numbers can be assigned to each port, such that a maximum of (16×256) switches can be provided to each section according to the preferred embodiment of the present invention.

In the child system (or the grandchild system under the child system), if any JOG controller is operated, the JOG-controller operation information is reported from the child system to the parent system 220 by a packet called "C13:JOG Controller". The JOG controller acts as an operator for establishing a parameter according to a relative change amount of the operation degree. In the case of the digital mixer according to the preferred embodiment of the present invention, a variety of rotary encoders serve as the JOG controller. In the C13:JOG controller, first data is set to "Cxh", and second data is indicative of category information of the JOG controller according to the values of "00h" to "FFh". Third data indicates a relative change amount of the operation degree using a resolution composed of 8 bits. Therefore, a maximum of (16×256) JOG controllers can be provided to each child system (or a grandchild system under the child system).

In the child system, if any continuous controller is operated, the continuous-controller operation information is reported from the child system to the parent system 220 by a packet called "C14:Continuous Controller". The continuous controller acts as an operator for establishing a parameter according to an absolute value of the operation degree composed of 16-bits resolution. In the case of the digital mixer according to the preferred embodiment of the present invention, the electric faders serve as the continuous controller. As described above, in the sub-section 103-A, the touch-screen 130 detects either on/off information caused by a write pen or user's finger or the pen's- or finger's pressed location information. Specifically, the above-mentioned pressed on/off information is considered to be a switch on/off operation. X- and Y-coordinates of the pressed location are considered to be operation amounts of individual continuous controllers.

In the C14:Continuous controller's packet, first data is set to "Exh", second data is indicative of upper 8 bits of the operation amount, and third data is indicative of lower 8 bits of the operation amount. The continuous controller (e.g., an electric fader, etc.) for use in the preferred embodiment of the present invention is directly monitored/controlled by the child system. Identification (ID) information of the continuous controller is only a port number, such that individual child systems for use in the present invention can provide a maximum of 16 continuous controllers.

(3.2) Data Transmission from Parent System to Child System

A packet for transmitting data from the parent system to the child system will hereinafter be described. In the above-mentioned packet, a destination address corresponds to any child system, a source address corresponds to an address of the parent system 220. If the LED lighting-on state is prescribed for the child system (or the grandchild system under the child system), the LED lighting-on state information is reported from the parent system 220 to the child system corresponding to the parent system 220 by a packet called "C21:LED Control".

In the above-mentioned packet "C21:LED Control", first data is indicative of "6xh", and second data is indicative of a group number from "00h" to "FFh". In this case, the group is indicative of a single LED or the set of a plurality of LEDs that must simultaneously establish brightness information. The third data is indicative of brightness information prescribed for a corresponding group, and is in the range from "00h" to "FFh". In this case, data of "00h" indicates a lighting-on state, and data of "FFh" indicates a lighting-on state of maximum brightness, such that a lighting-on state of intermediate brightness is represented by the value between the data of "00h" and the other data of "FFh".

If it is determined that any one of LEDs is contained in any group, the above-mentioned determination information is reported from the parent system 220 to the child system by the packet called "C22:LED Group Setup". In the above-mentioned packet "C22:LED Group Setup", first data is indicative of "7xh", second data is indicative of an LED number from "00h" to "FFh", and third data is indicative of a group number from "00h" to "FFh".

For example, if the child system receives the packet "C21: LED Control", and any group brightness of the child system or the grandchild system under the child system is determined, all LEDs contained in the group are turned on or off at the determined brightness.

If the child system receives the packet "C22:LED Group Setup", and any one of LEDs is contained in any group, the LED is turned on or off at a brightness prescribed for the group. In addition, a brightness of the group "00h" is fixed to "00h" (Lighting-Off state), and a start-up state of the group "FFh" is fixed to "FFh" (Maximum Brightness), and it is impossible to change the above-mentioned brightness and the start-up state.

By a scene recall executed by the parent system 220, a parameter value of any JOG controller of the child system (or the grandchild system under the child system) is changed to another parameter value, the child system, etc. must indicator information of the corresponding parameter. In this case, the parameter value is reported from the parent system 220 to the child system by the packet called "C23:JOG Controller".

In accordance with the preferred embodiment of the present invention, the LEDs are circularly arranged in the vicinity of a variety of rotary encoders, an approximation value of the parameter corresponding to each rotary encoder is represented by the LEDs' lighting-on state. In the C23: JOG controller, first data is indicative of "Cxh", and second data is indicative of category information of the JOG controller using values from "00h" to "FFh". Third data indicates the parameter value based on the JOG controller using a resolution composed of 8 bits.

In the case where an operation amount of any continuous controller must be established for the child system, the operation-amount setup information is reported from the parent system 220 to the child system by the packet called "C24: Continuous Controller".

As described above, in accordance with the preferred embodiment of the present invention, an electric fader and X- and Y-coordinates of the touch-screen 130 are used as continuous controllers. Specifically, the continuous controller having an operation amount determined by the parent system 220 is only the electric fader. In the packet "C24:Continuous Controller", first data is indicative of "Exh", second data is indicative of upper 8-bits of an operation amount to be established, and third data is indicative of lower 8-bits of an operation amount to be established.

2.2. S Bus Protocol 2.2.1. Physical Configuration

The protocol of S-buses 211~214 connected between the child system and the grandchild system under the child system will hereinafter be described. As previously stated in FIG. 3, two grandchild systems 201-B and 201-C are connected to the child system 201-A. Provided that only the grandchild system 201-B is connected to the child system 201-A on a one-to-one basis, the following bus configuration shown in FIG. 8*a* is acquired.

Figure 8A:
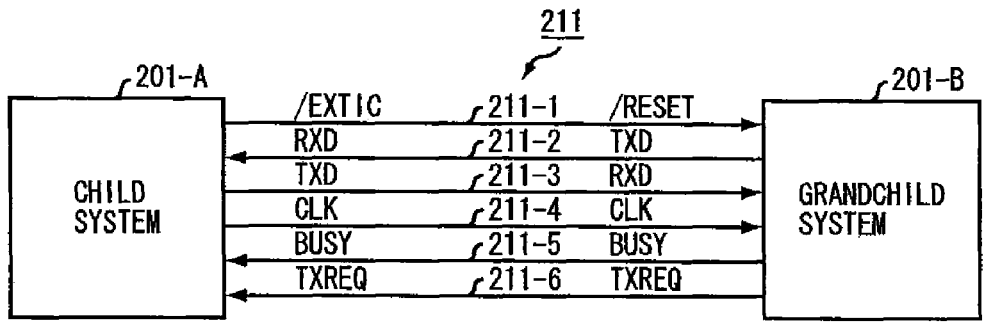
FIGS. 8(a) and 8(b) are a block diagram illustrating S-bus system configuration.

In FIG. 8*a*, an initialization signal (/EXTIC) generated from the child system 201-A is transmitted as a reset signal (/RESET) to the grandchild system 201-B via a connection line 211-1. An output data signal (TXD) of the grandchild system 201-B is transmitted as an input data signal (RXD) to the grandchild system 201-A via a connection line 211-2. On the contrary, an output data signal (TXD) of the child system 201-A is transmitted as an input data signal (RXD) to the grandchild system 201-B via the connection line 211-3.

The child system 201-A outputs a clock signal (CLK) to the grandchild system 201-B via a connection line 211-4. The grandchild system 201-B outputs a busy signal (BUSY) and a transmission request signal (TXREQ) to the child system 201-A via the connection lines 211-5 and 211-6, respectively.

In this case, the busy signal (BUSY) is set to "0" when it is unable to receive data from the child system 201-A by an internal process of the grandchild system 201-B. Otherwise, the busy signal (BUSY) is set to "1" when it is able to receive the data from the child system 201-A by the internal process of the grandchild system 201-B.

If data to be transmitted from the grandchild system 201-B to the child system 201-A occurs, the transmission request signal (TXREQ) is set to "0" in the case where permission of the data transmission is required for the child system 201-A, and is set to "1" in other cases other than the above-mentioned case.

Figure 8B:
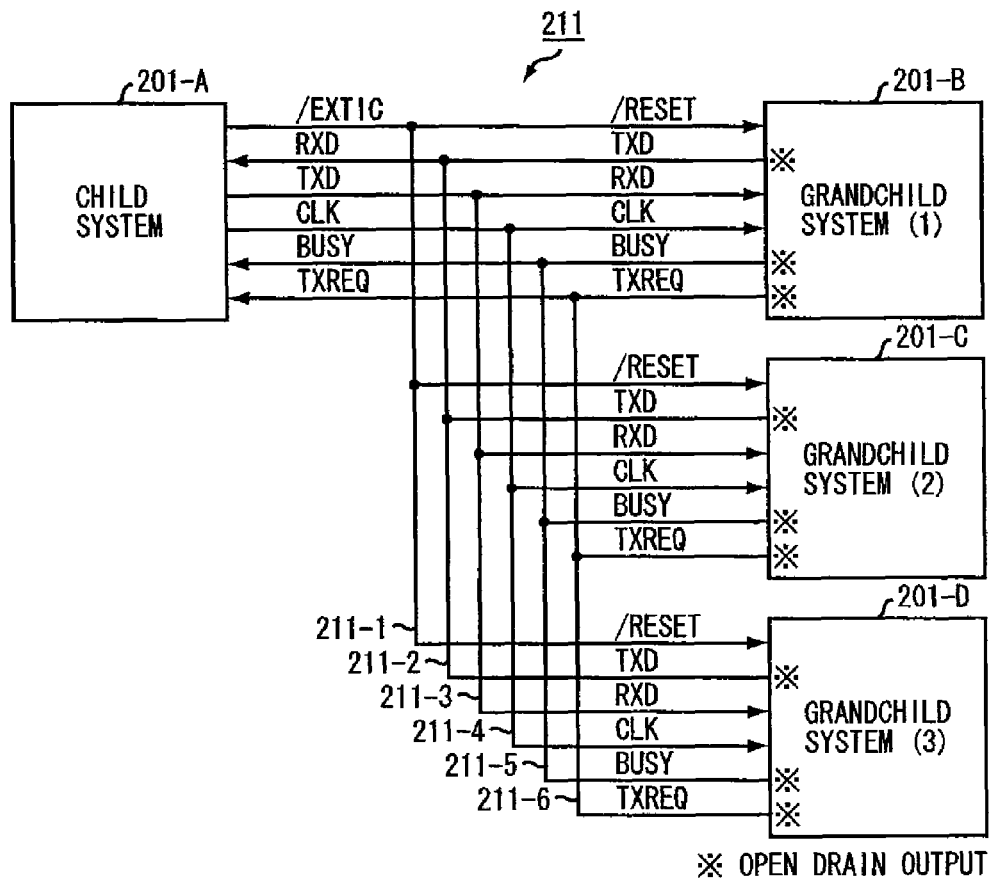

As shown in the actual configuration of the preferred embodiment of the present invention, a connection state in which a plurality of grandchild systems are connected to the child system 201-A is shown in FIG. 8b. In accordance with the preferred embodiment of the present invention, two grandchild systems are connected to the child system 201-A. For the convenience of the description, a connection state in which three grandchild systems 201-B, 201-C, and 201-D are connected to the child system 201-A is shown. A maximum of 7 grandchild systems can be connected to a single child system. Unique addresses 000b~110b are assigned to individual grandchild systems. In FIG. 8b, all connection lines 211-1 to 211-6 shown in FIG. 8a are connected in parallel to all child systems 201-B to 201-D. Therefore, an initialization signal (/EXTIC) generated from the child system 201-A, an output data signal (TXD), and a clock signal (CLK) are supplied to all grandchild systems in parallel.

If a plurality of grandchild systems are connected to the child system in parallel, the output data signal (TXD), the busy signal (BUSY), and the transmission request signal (TXREQ) generated from the grandchild system must be generated from an open-drain terminal, and there is a need to pull-up a corresponding connection line. Therefore, an AND result of an output signal of each grandchild system is received in the child system 201-A. For example, if each grandchild system is in a busy state, the grandchild system outputs a busy signal of "0". If the grandchild system is not in the busy state, the grandchild system outputs a busy signal of "1". Therefore, the child system receives the busy signal of "0" when any grandchild system is in a busy state, and receives the busy signal of "1" when all grandchild systems under the child system are not in the busy state.

2.2.2. Packet Format

Figure 9A:
FIGS. 9(a) through 9(f) show packet configuration of the S-bus system.

Packet transmission/reception is established between the child system and the grandchild system by the output data signal (TXD) and the input data signal (RXD), such that data transmission is performed. In this case, format information of the transmission packet will hereinafter be described with reference to FIGS. 9a to 9f. Each packet is transmitted/received in 1-byte sections. As can be seen from FIG. 9a, a packet transmitted from the child system to the grandchild system is denoted by meshed lines, and there is no mark in a packet transmitted from the grandchild system to the child system.

Figure 9B:
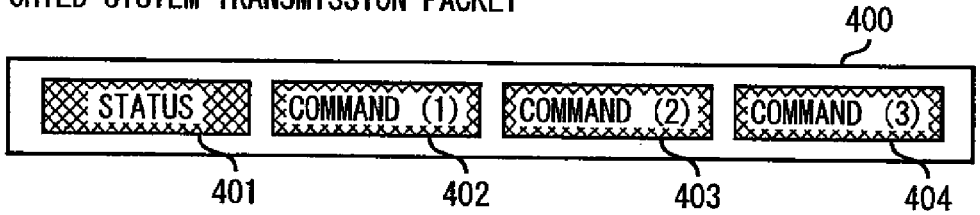

If data is transmitted from the child system to any grandchild system, a child-system transmission packet 400 shown in FIG. 9b is transmitted/received. In the packet 400, the reference number 401 is indicative of a status byte positioned at a head part, such that not only a grandchild system address at which the packet 400 must be received but also data transmission direction, etc. are stored in the status byte. The reference numbers 402 to 404 are indicative of first to third data, and the first to third data is equal to first to third data of the E-bus protocol shown in FIG. 7.

Figure 9C:
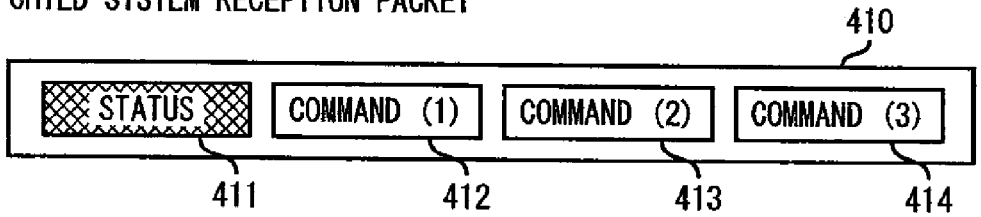

If the child system receives data from any grandchild system, the child system reception packet 401 shown in FIG. 9c is transmitted/received. The reference number 411 contained in the packet 410 is indicative of a status byte equal to the above-mentioned status byte 401. The reference numbers 412 to 414 are indicative of first to third data, and the first and third data is equal to first to third data of the E-bus protocol shown in FIG. 7. The above-mentioned data is transmitted via the grandchild system prescribed at the status byte 411.

If any grandchild system requires data transmission for the child system, for example, if any operation event occurs in an operator monitored/controlled by the grandchild system, the transmission request signal (TXREQ) of the grandchild system is set to "0". However, the transmission request signal (TXREQ) received in the child system is acquired by the AND result of all the transmission request signals (TXREQs) generated from all the grandchild system systems, such that the child system cannot immediately specify the grandchild system having transmitted the transmission request.

Figure 9D:
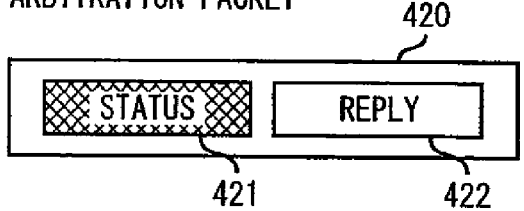

Therefore, in order to specify the grandchild system having transmitted the transmission request, an arbitration packet 420 shown in FIG. 9d is transmitted/received. The reference number 421 in the packet 420 is indicative of a status byte, and indicates that the packet 420 is equal to the arbitration packet. The reference number 422 is indicative of a reply byte, such that the reply byte is transmitted from all grandchild systems under the child system. Therefore, the reply byte 422 received in the child system is acquired by the AND result of all grandchild systems.

The status bytes 401, 411, and 412 will hereinafter be described with reference to FIG. 9e. Upper 3 bits of the status bytes 401, 411, and 412 construct the address 430.

The above-mentioned address 430 has the value of a specific grandchild system address "000b" to "110b" in the child system transmission packet 400 or the child system reception packet 410. The address 430 for use in the arbitration packet 420 is set to "111b", such that the value of "111b" indicates broadcast information for simultaneous communication to all grandchild systems. Upper 4 bits of the status byte correspond to a communication direction flag 432. If the child system outputs first to third data following the status byte, the value of "0" is determined. If the grandchild system must output the first to third data or the reply byte 422, the value of "1" is determined. Lower 4 bites of the status byte construct an error check code 434. The error check code 434 corresponds to the value of lower 4-bits of the counted result acquired when all status bytes generated from the child system are incremented by a predetermined value "1". If the communication direction flag 432 of the arbitration packet is set to "1", the packet of an inverse-direction "0" (Write) associated with the address "111b" can be used as other commands.

Data transmitted from each grandchild system to the child system as the reply byte 422 contained in the arbitration packet 420 will hereinafter be described. If the grandchild system does not output the transmission request signal (TXREQ), the reply byte generated from the grandchild system is identical with "11111111b". If the grandchild system outputs the transmission request signal (TXREQ) of "0", contents of the reply byte are changed according to individual addresses of the grandchild system. As can be seen from FIG. 9f, a specific location bit uniquely corresponding to the address of the grandchild system is set to "0", and the remaining bits other than the bit "0" are set to "1".

Since the child system receives the AND result of the reply byte generated from the grandchild system, the grandchild system having transmitted the transmission request can be specified on the condition that the bit of "0" from among individual bits of the received reply byte 422 is retrieved. For example, if the reply byte is equal to "11111010b", it can be recognized that a transmission request occurs in two grandchild systems denoted by individual addresses "000b" and "010b".

2.2.3. Detailed Example of Packet Transmission (1) Data Transmission from Child System to Grandchild System Data transmission from the child system to the grandchild system will hereinafter be described with reference to FIG. 10. A specific case in which three grandchild systems are connected to the child system is as follows.

In FIGS. 10~12, signals Data1~Data3 are indicative of data signals generated from three grandchild systems 201-B, 201-C, and 201-D. Signals BUSY1~BUSY3 are indicative of busy signals generated from three grandchild systems 201-B, 201-C, and 201-D. Signals TXREQ1~TXREQ3 are indicative of transmission request signals generated from three grandchild systems 201-B, 201-C, and 201-D. A variety of processes are performed in individual grandchild systems. If the processes are completed, busy signals BUSY1~BUSY3 of individual grandchild systems are raised to the value of "1" during the specific times t1~t3. At the specific time t3 at which all busy signals BUSY1~BUSY3 are raised, the busy signal received in the child system is set to "1", such that the child system can confirm that all grandchild systems are able to receive the status byte.

Under the above-mentioned situation, if data should be transmitted to a specific grandchild system, the child system sequentially transmits individual bits of the status byte 401. The clock signal (CLK) is synchronized with the output timing points of individual bits, such that it falls to "0". If individual grandchild systems begin to receive the status byte, the grandchild system receives the status byte, and at the same time the busy signals BUSY1~BUSY3 fall to "0" during the time t5~t7 in order to perform a process corresponding to the status byte.

If one of the above-mentioned busy signals BUSY1~BUSY3 is set to "0", the busy signal received in the child system becomes "0". Therefore, the child system waits for data transmission to the grandchild system until the busy signal (BUSY) is re-raised to "1".

In this case, the address 430 of the status byte 401 is compared with an address of each grandchild system, such that it is determined whether the address 430 of the status byte 401 is equal to or different from the address of the grandchild system. It is assumed that only the grandchild system 201-C determines that the address 430 of the status byte 401 is equal to the address of the grandchild system 201-C. It is assumed that other grandchild systems other than the grandchild system 201-C determines that the address 430 of the status byte 401 is different from those of the above grandchild systems other than the grandchild system 201-C.

The grandchild system 201-C determines whether it outputs first to third data corresponding to the communication direction flag 432, or receives first to third data generated from the child system. Each grandchild system determines whether the result of the error check code 434 is fair, and the processed detailed result of the error check code 434 will hereinafter be described.

If the above-mentioned status byte 401 in each grandchild system is completely processed, individual busy signals BUSY1~BUSY3 are raised to "1" during the time t8~t10. The last busy signal (BUSY) becomes "1" at the last time t9. If the child system confirms that the busy signal (BUSY) becomes "1", individual bits of first data 402 are sequentially outputted at the time t11. In order to interpret a first command 402, each busy signal (BUSY) of the grandchild system falls to "0" during the time t12~t14. A total busy signal (BUSY) falls to "0" at the earliest time t12.

First data 402 of the child system 201-C is valid data, and a specific data corresponding to content data of the first data 402 is performed. The content data of the first data of other grandchild systems is disregarded. If the disregard determination of each grandchild system or the execution of a necessary process is terminated, the busy signal (BUSY) is raised to "1" at the time t15~t17. The same process as the above-mentioned process is executed in second data 403 and third data 404. By the above-mentioned process, first to third data is transmitted from the child system to the grandchild system 201-C.

(2) Data Transmission from Grandchild system to Child system

Data transmission from the grandchild system to the child system will hereinafter be described with reference to FIGS. 11~12. An operation event of any operator occurs in the sub-section monitored/controlled by the grandchild systems 201-B and 201-D. In the grandchild systems 201-B and 201-D, it is assumed that the transmission request signals (TXREQ1 and TXREQ3) fall to "0" at the times t44 and t45 of FIG. 11, such that the above-mentioned event can be transmitted to the parent system via the child system. All transmission request signals (TXREQ) fall to "0" at the earliest time t44.

If the transmission request signal TXREQ of "0" is detected, the child system determines whether the total busy signal (BUSY) is equal to "1". If the total busy signal (BUSY) is equal to "0", the child system is in a standby mode until the value of "0" is changed to the value of "1".

The busy signal (BUSY) at the time t44 is set to "1", such that the output of the status byte 421 of the arbitration packet 420 begins at the next time t46. In order to receive or interpret the above-mentioned status byte at the times t47~t49, busy signals BUSY1~BUSY3 of individual child systems are sequentially descended to "0".

In the child systems 201-B and 201-D having generated the transmission request signals TXREQ1 and TXREQ3 of "0", respectively, it is determined that the reply byte for notifying transmission request output fact information of the child systems 201-B and 201-D should be reported to the status byte 421.

In the meantime, there is no transmission request in the grandchild system 201-C, such that it is determined that the reply byte for notifying no transmission request output state of the grandchild system 201-C must be reported. If the above-mentioned determination is completed and it is ready to transmit the reply byte, each grandchild system raises the busy signal BUSY1~BUSY3 to the value of "1" at the times t50~t52. If it is determined that the total busy signal (BUSY) becomes "1" in the child system, the child system begins to output the clock signal (CLK) at the time t53.

Figures 9E, 9F:
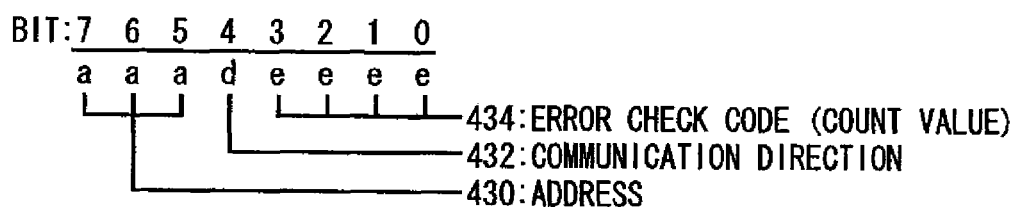

If each child system detects the falling of the clock signal (CLK), individual bits of the reply byte 422 depicted in FIG. 9f are sequentially outputted on the basis of not only specific information indicating whether the grandchild system currently outputs the transmission request signals TXREQ1~TXREQ3, but also address information of the grandchild system.

Individual bits of the reply byte are AND-operated at each bit, and the AND-operation result is received in the child system. The grandchild system having transmitted the transmission request signal (TXREQ) "0" in association with the bit of "0" contained in the received reply byte 422 corresponds to the reference numbers 201-B and 201-D, and the above-mentioned fact indicating that the grandchild system corresponds to the reference numbers 201-B and 201-D is confirmed by the child system. If the output of the reply byte is completed, the busy signals BUSY1~BUSY3 of individual grandchild systems are raised to "1" at the times t57~t59, respectively.

In FIG. 12, if the child system confirms that the total busy signal is equal to "1", individual bits of the status byte 411 of the child system reception packet 410 associated with any one (here, it is assumed that the grandchild system corresponds to the reference number 201-B) of grandchild systems having transmitted the transmission request are sequentially outputted from the child system at the time t60. Each child system receives the status byte, and at the same time busy signals BUSY1~BUSY3 are descended to "0" at the times t61~t63 to perform a process corresponding to the received status byte.

In this case, the address 430 of the status byte 401 is compared with an address of each grandchild system, such that it is determined whether the address 430 of the status byte 401 is equal to or different from the address of the grandchild system. It is assumed that only the grandchild system 201-B determines that the address 430 of the status byte 401 is equal to the address of the grandchild system 201-B. It is assumed that other grandchild systems other than the grandchild system 201-B determines that the address 430 of the status byte 401 is different from those of the above grandchild systems other than the grandchild system 201-B.

The grandchild system 201-B determines whether it outputs first to third data corresponding to the communication direction flag 432, or receives first to third data generated from the child system. In this case, it is assumed that a specific state denoted by "1" (Read) during which the grandchild system 201-B transmits data is provided. If each grandchild system terminates the process of the above-mentioned status byte 411, individual busy signals BUSY1~BUSY3 are raised to "1" during the times t64~t66. The last busy signal (BUSY) becomes "1" at the last time t65. If it is confirmed that the busy signal (BUSY) becomes "1", the child system begins to output the clock signal (CLK) at the time t67.

If the grandchild system 201-B detects the falling of the clock signal (CLK), content data of first data 412 of the transmission-requested packet is synchronized with the clock signal (CLK), such that the grandchild system 201-B outputs the synchronization result.

In the meantime, other grandchild systems in which an inconsistent address occurs output a dummy data signal (i.e., the signal "1"). The AND-operation result is equal to first data 412 generated from the child system 201-B, first data 412 is received in the child system. If the output of the first data 412 or the dummy data is completed, busy signals BUSY1~BUSY3 of individual grandchild systems are raised to "1" at the times t71~t73. Thereafter, if the clock signals (CLK) of second data 413 and third data 414 are sequentially generated in the child system, the grandchild system 201-B sequentially outputs second data 413 and third data 414 after being synchronized with the clock signals.

Data transmission from the grandchild system 201-B to the child system is terminated by the above-mentioned operations, such that the transmission request signal (TXREQ1) of the grandchild system 201-B is raised to "1" at the time t88.

However, data transmission is not yet executed in the grandchild system 201-B having transmitted another transmission request, such that the transmission request signal (TXREQ3) is continuously maintained at "0". Therefore, the same process as in the times t60~t88 is executed between the child system and the grandchild system 201-D.

Figure 13A:
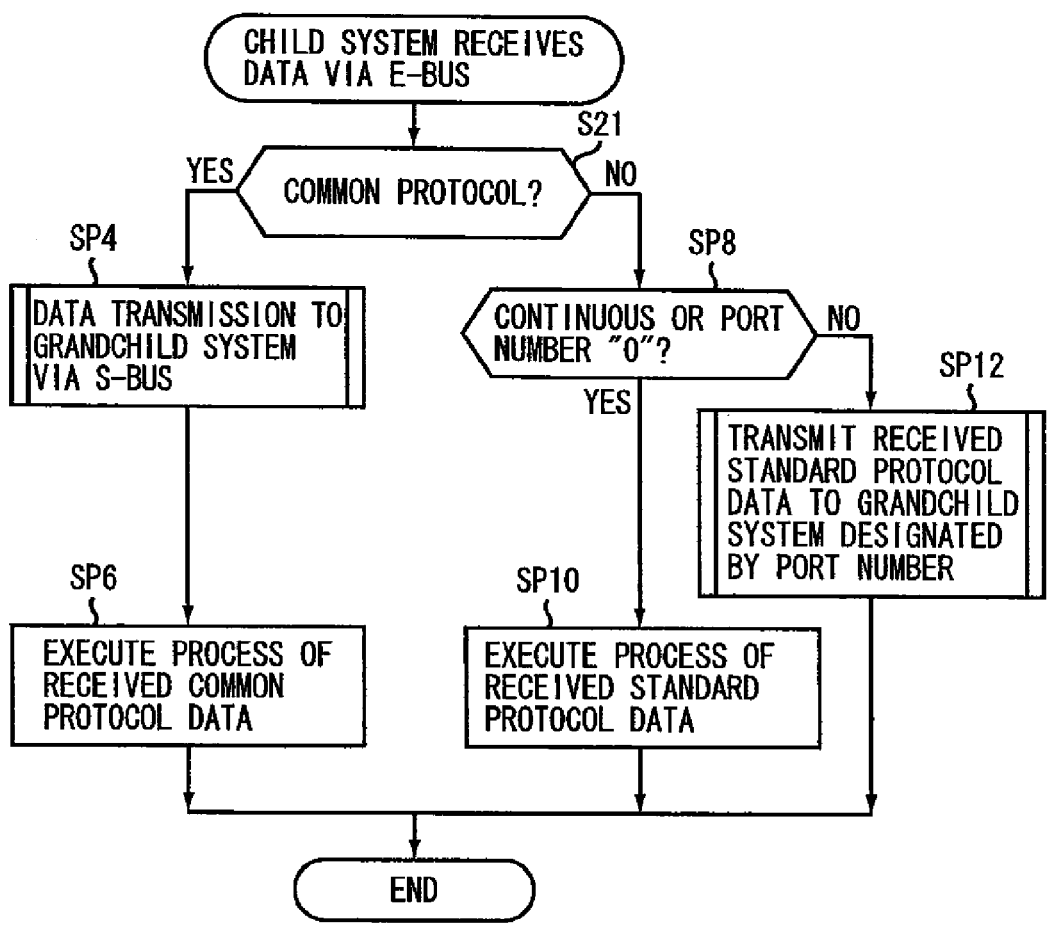
FIGS. 13(a) and 13(b) are a flow chart illustrating data reception routines of the child and grandchild systems.

3. Operations of Preferred Embodiment 3.1. Child System: Data Reception from Parent System A detailed operation performed when the child system receives a packet from the parent system via the E-buses 216 and 217 will hereinafter be described. If the packet of 5 bytes is received in the child system via the E-buses 216 and 217, a data reception routine shown in FIG. 13a is driven at the child system.

If the process goes to step SP2, it is determined whether a received packet is equal to a common protocol packet. If it is determined that the received packet is equal to the common protocol packet, the process goes to step SP4, such that a data part 380 of a corresponding common protocol packet is transmitted to the grandchild system under the child system. If the process goes to step SP6, a process corresponding to the data part 380 of the received common protocol is performed. In other words, if the packet "C01:E-bus Start" is received, an initialization process required for the child system is executed. If the packet "C02:Category ID•Sub-address•Request" is received, the packet "C03:Category ID•Sub-address•Reply" is received in the parent system 220.

In the meantime, if it is determined that the received packet is not equal to the common protocol packet, the received packet always serves as the standard protocol packet. Content data of first data contained in the data part 380 is checked at step SP8, such that it is determined whether which one of a first condition that the above-mentioned packet is equal to the packet "C24:Continuous Controller" and a second condition that the port number "x" of the first data is equal to "0h" is satisfied.

In accordance with the preferred embodiment of the present invention, the child system is designed to directly monitor/control the continuous controller without using the grandchild system. If a specific device is directly monitored/controlled by the child system, the specific device has a superior response to a user's operation. In association with other operators, etc., a specific port number (x) "0h" is assigned to a device directly monitored/controlled by the child system.

Therefore, it is determined at step S8 whether the received packet is equal to a packet directly processed by the child system without using the grandchild system. In association with the continuous controller, it is preferable that the child system and the grandchild system can be classified according to the port number (x) in the same manner as in other operators.

If it is determined that the received packet is determined to be the packet directly processed by the child system without using the grandchild system at step SP8, the process goes to step SP10, such that a corresponding process is executed on the basis of the data part 380 of the received standard protocol. For example, if the received packet is determined to be the packet "C24:Continuous Controller", the electric fader is driven until an operation amount of the electric fader corresponding to the port number (x) reaches predetermined operation amounts derived from second data and third data.

In the meantime, if it is determined that the received packet is not equal to the packet directly processed by the child system without using the grandchild system at step SP8, the process goes to step SP12. In association with operators other than the continuous controller of the child system, the grandchild system is assigned to the port number (x). Therefore, the data part 380 is transmitted to the grandchild system corresponding to the port number (x) via the S-bus.

Figure 15A:
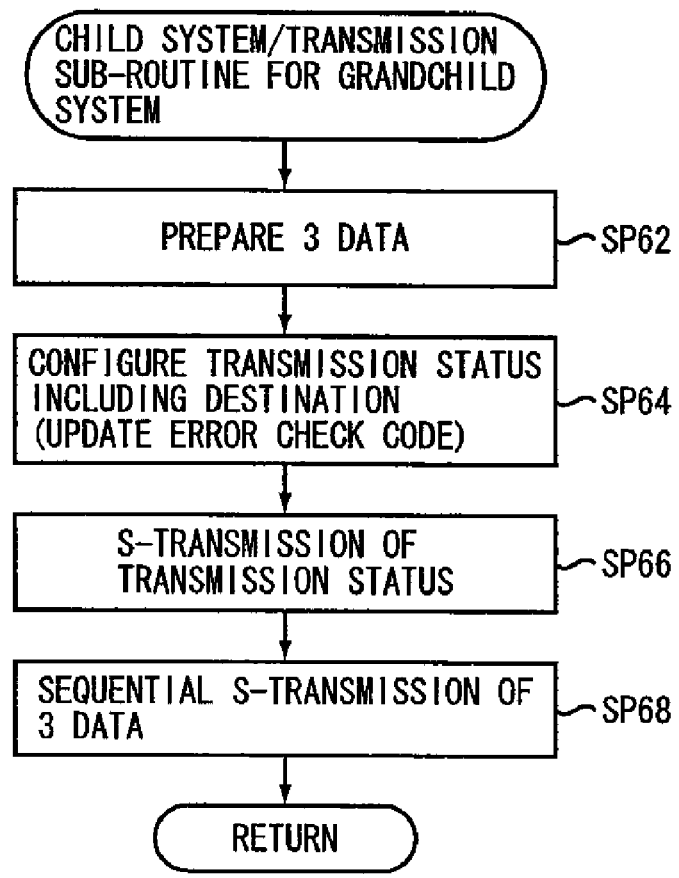
FIGS. 15(a) and 15(b) are a flow chart illustrating a transmission sub-routine and a transmission-request interrupt routine of the child system in association with the grandchild system.

A transmission sub-routine for the grandchild system in FIG. 15a is retrieved at steps SP4 and SP12, such that an actual transmission process is executed. The above-mentioned sub-routine will hereinafter be described. In FIG. 15a, if the process goes to step SP62, first to third data to be transmitted to the grandchild system is prepared, such that the first to third data is stored in a predetermined register. If the process goes to step SP64, the status byte 401 for the child system transmission packet 400 is configured.

In the above-mentioned status byte 401, the address 430 is indicative of an address of a grandchild system that must transmit first to third data, the communication direction flag 432 is set to "0" (Write). The value of the error check code 434 is determined to be a specific value acquired when an old error check code used for the last status byte having transmitted is incremented by a predetermined number "1". If the process goes to step SP66, the status byte 401 is transmitted to individual grandchild systems, such that first to third data is sequentially outputted at step SP68.

In this way, in the transmission sub-routine (See FIG. 15a) for the grandchild system at steps SP4 and SP12, the data part 380 (i.e., first to third data) received from the parent system 220 is transmitted to the grandchild system without any change. In accordance with the preferred embodiment of the present invention, there is no need to pre-perform data conversion in the child system, such that load of the child system can be greatly reduced.

3.2. Grandchild System: Data Reception from Child System

Figure 16:
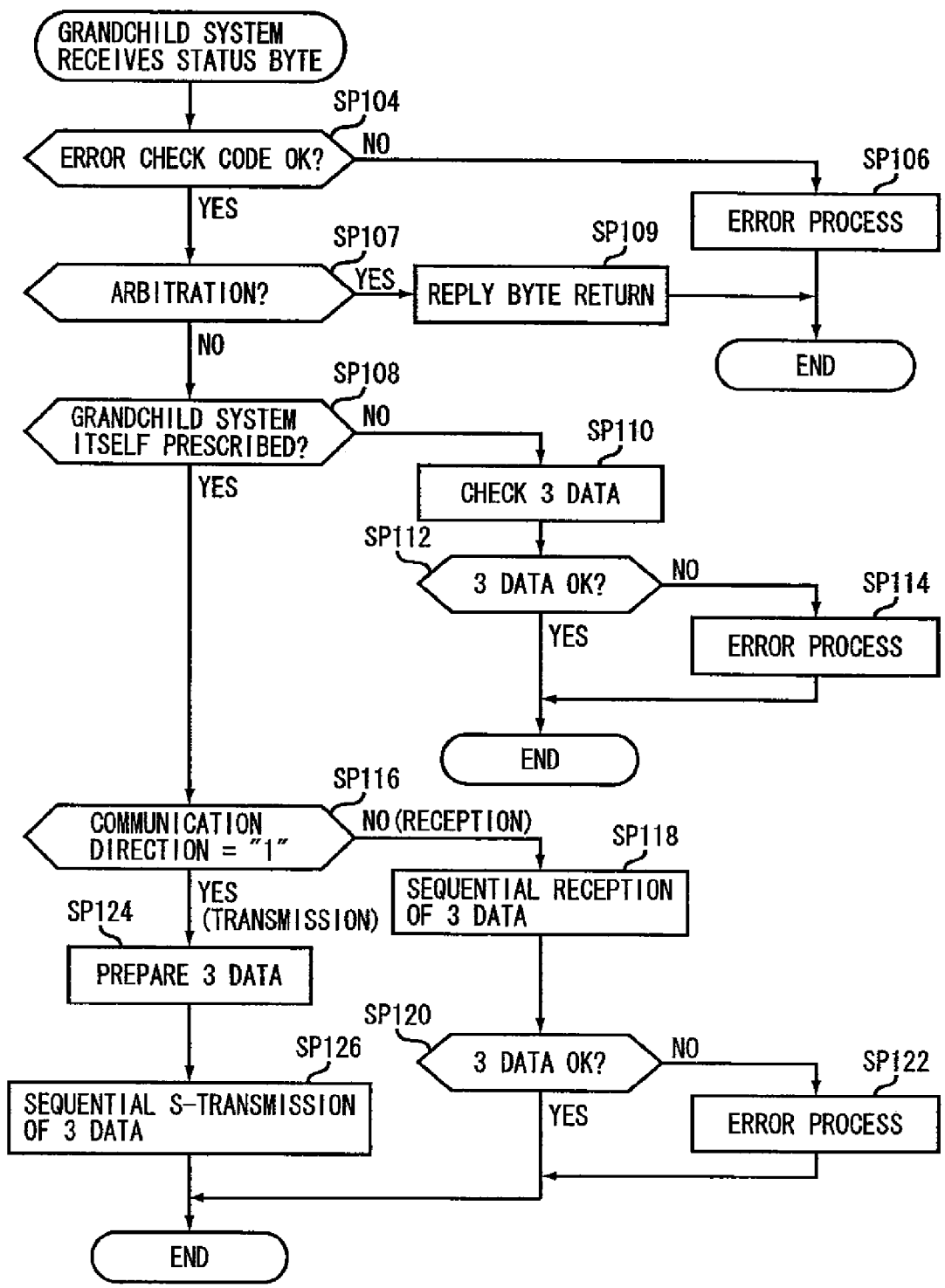
FIG. 16 is a flow chart illustrating a status byte reception event routine of the grandchild system.

Although the child system transmits the status byte to the grandchild system at step SP66 of the transmission sub-routine (See FIG. 15a) associated with the grandchild system, if the reception of the status byte is completed, the status byte reception event routine shown in FIG. 16 is driven in each grandchild system. If the process goes to step SP104, it is determined whether the error check code 434 is normal at step SP104. In more detail, it is determined at step SP104 whether the received error check code 434 is equal to a specific value acquired when an old error check code used for the last status byte is incremented by a predetermined number "1".

In this case, if it is determined that the received error check code 434 is equal to the specific value at step SP104, the process goes to step SP106, and a predetermined error process is executed, such that this routine process is completed.

In the meantime, if the error check code 434 is normal, the process goes to step SP107, and it is determined whether the status byte is equal to the status byte 421 of the arbitration packet. If it is determined that the status byte is not equal to the status byte 421 of the arbitration packet, the process goes to step SP108, such that it is determined whether the grandchild system is specified by the address 430 contained in the status byte. If it is determined that the grandchild system is specified by the address 430 of the status byte at step SP108, the process goes to step SP116, such that it is determined whether a communication direction flag 432 is set to "1" (Read) at step SP116. If it is determined that the communication direction flag 432 is set to "0" (Write), the process goes to step SP118, such that first to third data is sequentially received.

A predetermined maximum time is assigned to the execution time of the above step SP118. In the case where first to third data is not received during the above-mentioned maximum time, the process of step SP118 is interrupted as a time-out operation. If the process goes to step SP120, it is determined whether content data of first to third data is normal. If the time-out operation occurs, it is determined that first to third data is always abnormal. If the result "NO" is determined at step SP120, the process goes to step SP122, and a predetermined error process is executed at step SP122, such that this routine process is completed. In the meantime, If result "YES" is determined at step SP120, this routine is normally terminated.

Figure 13B:
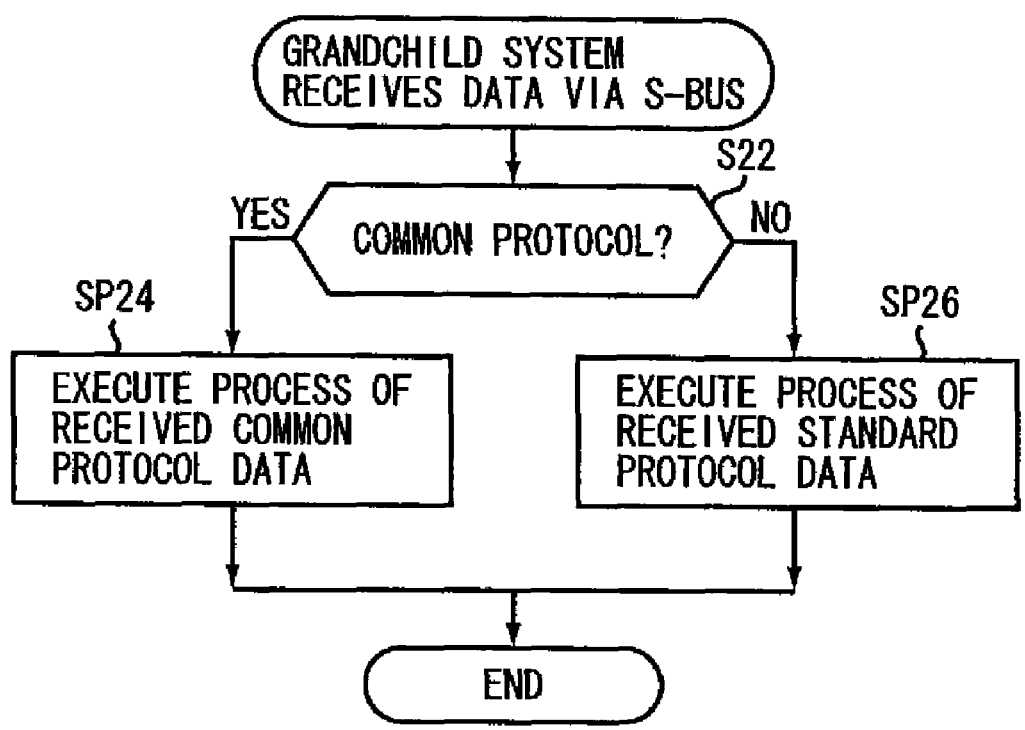

In this way, if the status byte reception event routine (See FIG. 16) is terminated after packets of first to third data are normally received, the data reception routine shown in FIG. 13b is continuously operated.

If the process goes to step SP22 in FIG. 13b, it is determined whether the received packet is equal to a common protocol packet. If the result "YES" is determined at step SP22, the process goes to step SP24, and a specific process corresponding to the data part 380 of the received common protocol is executed. For example, if the packet "C01:E-bus Start" is received, an initialization process required for the grandchild system is executed. In association with the packet "C02:Category ID•Sub-address•Request", the child system must independently reply to the parent system, such that the above-mentioned packet "C02:Category ID•Sub-address•Request" is disregarded in the grandchild system.

In the above step SP4 shown in FIG. 13a, the communication protocol packet received in the child system is transmitted to the grandchild system irrespective of content data of the communication protocol packet. Therefore, a packet unnecessary for the grandchild system is also transmitted from the child system, such that the grandchild system independently determines whether the received communication protocol packet is disregarded.

Therefore, if the communication protocol packet transmitted/received between the parent system and the grandchild system is newly determined, there is a need for the child system to transmit only the new communication protocol packet, and the child system need not recognize the added communication protocol, such that other tasks (e.g., design modification) can be simplified.

In the meantime, if the result "NO" is determined at step SP22, the process goes to step SP26. In this case, the received packet is always considered to be the standard protocol packet. A process corresponding to the data part 380 of the received standard protocol is executed at step SP26. For example, if the received packet is equal to the packet "C23: JOG controller", the port number (x) contained in first data and peripheral LEDs' lighting-ON/OFF states of a single rotary encoder corresponding to type (or category) information contained in second data are changed to another status data corresponding to the operation amount denoted by third data.

3.3. Grandchild System: Data Transmission Request Generation

Figure 14A:
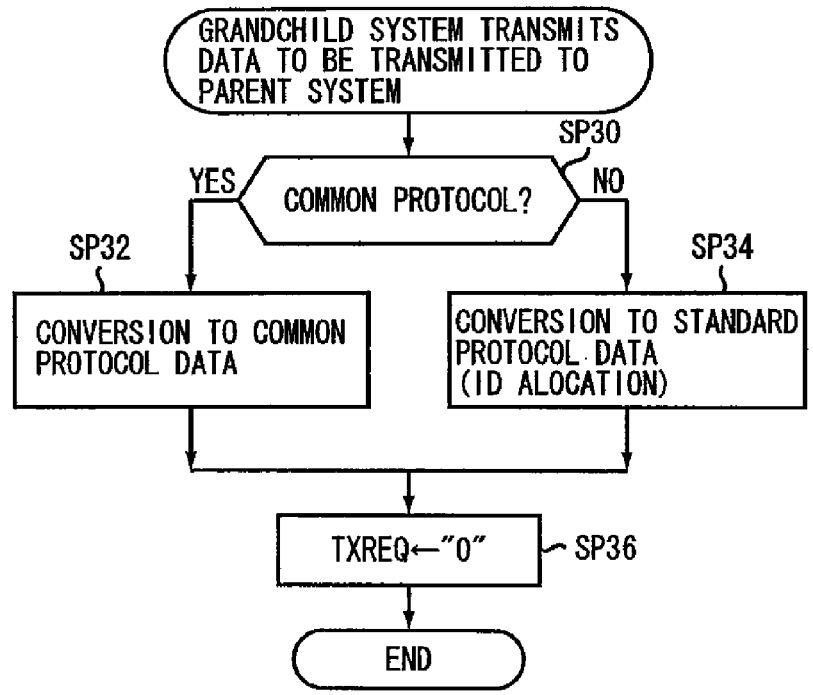
FIGS. 14(a), 14(b) and 14(c) are a flow chart illustrating a data generation event routine and a data reception event routine of the child and grandchild systems.

If data to be transmitted to the parent system occurs in the grandchild system, the data generation event routine shown in FIG. 14a is operated. The above-mentioned data transmitted from the grandchild system to the parent system includes first data to be transmitted by the standard protocol packet and second data to be transmitted by the common protocol packet. For example, if the operators (e.g., switches and rotary encoders, etc.) monitored/controlled by the grandchild system are operated, the operation information of the operators must be reported to the parent system via the standard protocol packet. If the grandchild system detects a malfunction of a corresponding grandchild system or a malfunction of the child system, the detected malfunction information must be reported to the parent system 220 via the common protocol packet "C04:Others".

In the above-mentioned data generation event routine, it is determined whether data to be transmitted at the initial step SP30 is transmitted by the common protocol. If the result "YES" is determined at step SP30, the process goes to step SP32, data for reporting error contents, etc. is configured in the form of first to third data for use in the common protocol packet "C04:Others".

In the meantime, if the result "NO" is determined at step SP30, first to third data of the standard protocol packet is configured on the basis of event content data (e.g., an operator). If the next process goes to step SP36, the transmission request signal (TXREQ) of "0" is outputted to transmit the generated packet to the child system, and this routine process is terminated.

Thereafter, the child system transmits the status byte 421 of the arbitration packet 420 upon receiving a corresponding transmission request signal (TXREQ). In this case, the above-mentioned status byte reception event routine of FIG. 16 is re-operated in each grandchild system. If the process goes to step SP107, the determination result "YES" is determined, such that the process goes to step SP109. Therefore, each grandchild system generates specific information indicating whether the grandchild system itself executes a transmission request, and generates a reply byte 422 on the basis of an address of the grandchild system itself, such that the reply byte 422 is synchronized with the clock signal (CLK) generated from the child system, and content data of the reply byte 422 is transmitted to the S-bus.

If the child system transmits the status byte 411 for indicating a single grandchild system having executed the transmission request or one of several grandchild systems having executed the transmission request, each child system re-operates the status byte reception event routine of FIG. 16. In the grandchild system designated as a reception end by the address 430 contained in the status byte 411, the process goes to step SP124 via steps SP104, SP108, and Sp116.

In this case, first to third data prepared by the data generation event routine of FIG. 14a is stored in a transmission register. If the process goes to step SP126, the first to third data is synchronized with the clock signal (CLK) generated from the child system, and is sequentially transmitted to the child system.

If the transmission of all data to be currently transmitted to the child system by the above-mentioned transmission operation is determined at step SP126, the transmission request signal (TXREQ) transmitted from the grandchild system is set to "1". In the meantime, if data to be transmitted to the child system remains, the transmission request signal (TXREQ) is maintained at "0".

3.4. Child System: Data Transmission to Parent System

Figure 14B:
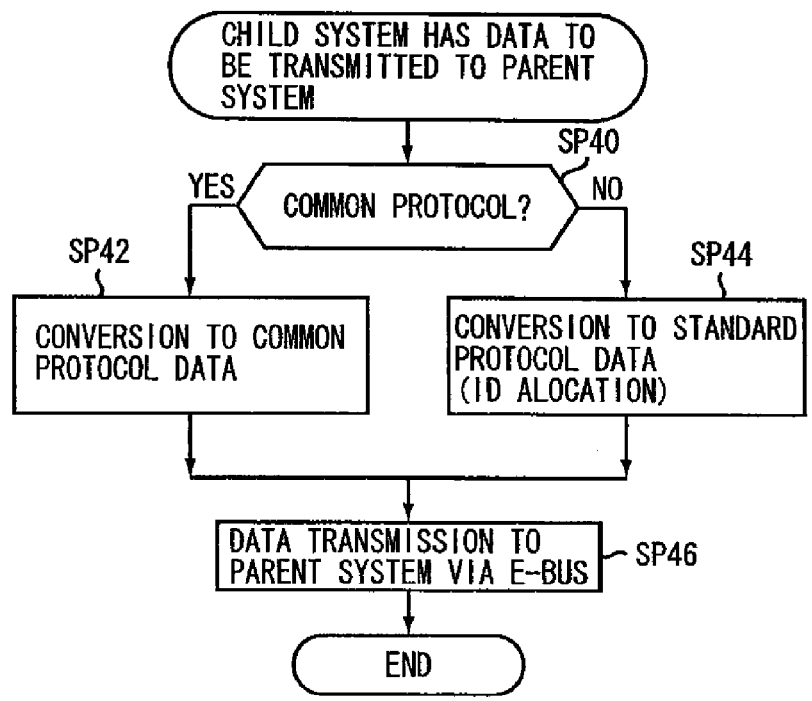

If data to be transmitted to the parent system occurs in the child system, the data generation event routine shown in FIG. 14b is operated. In the same manner as in the grandchild system, the data transmitted from the child system to the parent system includes first data to be transmitted by the standard protocol packet and second data to be transmitted by the common protocol packet. For example, if an electric fader monitored/controlled by the grandchild system is operated, the electric-fader operation information must be reported to the parent system via the standard protocol packet. If the child system detects a malfunction of its associated grandchild system or a malfunction of the child system itself, the detected malfunction information must be reported to the parent system 220 via the common protocol packet "C04: Others".

In the above-mentioned data generation event routine, it is determined whether data to be transmitted at the initial step SP40 is transmitted by the common protocol. If the result "YES" is determined at step SP40, the process goes to step SP42, data for reporting error contents, etc. is configured in the form of first to third data for use in the common protocol packet "C04:Others".

In the meantime, if the result "NO" is determined at step SP30, first to third data of the standard protocol packet is configured on the basis of event content data (e.g., an operator). If the next process goes to step SP46, first to third data is converted into E-bus packets, such that the E-bus packets are transmitted to the parent system 220.

Figure 15B:
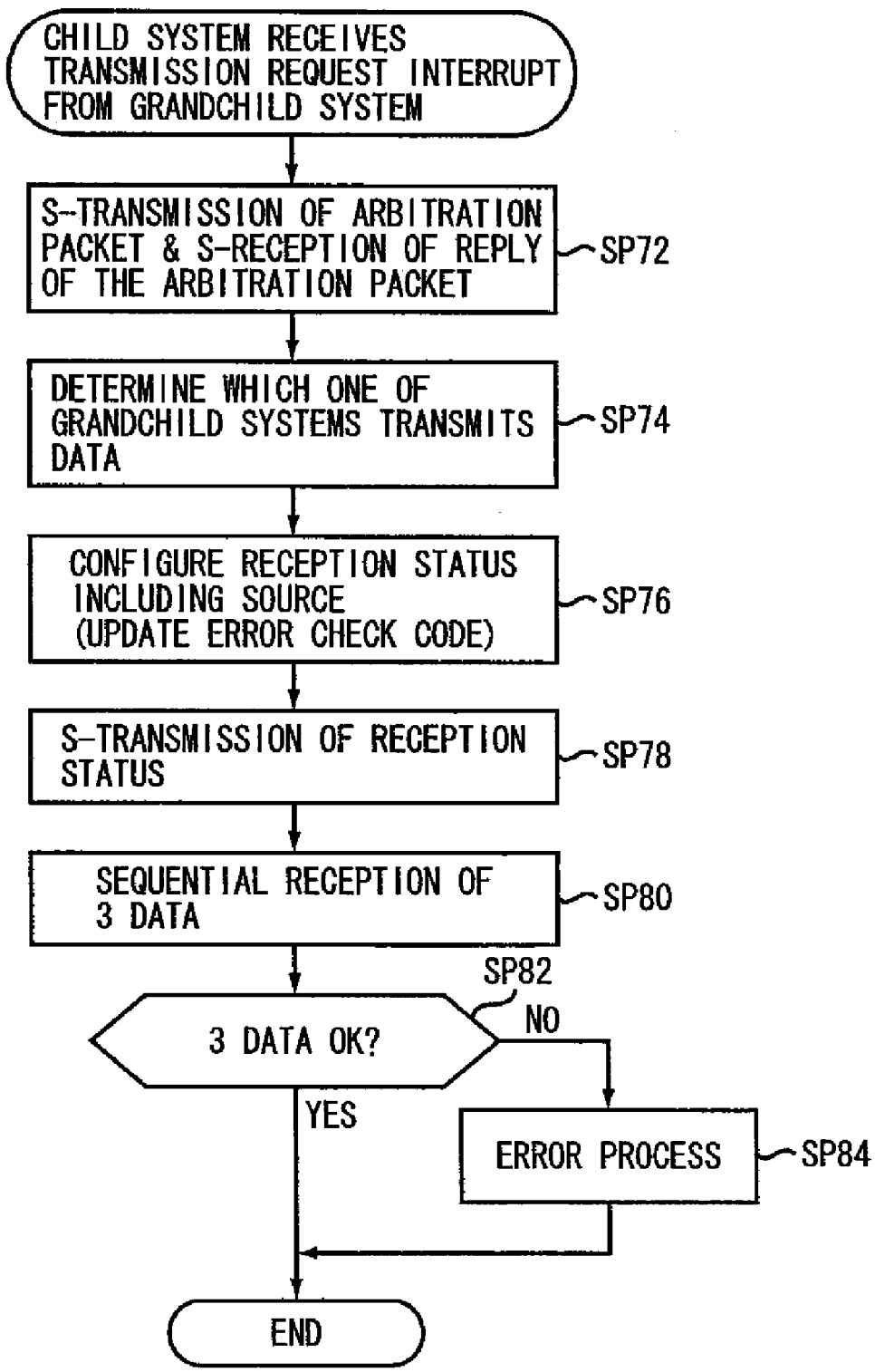

3.5. Child System: Process of Transmission Request generated from Grandchild System If the transmission request signal (TXREQ) received in the child system becomes "0", a transmission request interrupt for the CPU 252 occurs, and the transmission request interrupt routine of FIG. 15b is driven. If the process goes to step SP72, the status byte 421 of the arbitration packet 420 is transmitted to the grandchild system via the S-bus, and the reply byte 422 acquired by the AND-operation result of reply bytes generated from individual grandchild systems is received in the child system.

As described above, a plurality of grandchild systems may transmit the signal "0" for the reply byte 422, such that a grandchild system that must transmit data to the child system from among a plurality of grandchild systems is determined at step SP74. If the process goes to step SP76, the status byte 411 of the child system reception packet 410 is generated. The address 430 specified by the status byte 411 corresponds to the grandchild system address determined at step SP74.

A communication direction flag 432 is equal to "1" (Read), and an error check code 434 is set to a specific value acquired when an old error check code is incremented by a predetermined number "1".

If the process goes to step SP78, the status byte 411 is transmitted via the S-bus. If the process goes to step SP80, first to third data generated from the grandchild system is sequentially received. A predetermined maximum time is prescribed in the SP80's execution time. If all of first to third data is not received during the above-mentioned maximum time, the process of step SP80 is interrupted as a time-out operation. If the process goes to step SP82, it is determined whether content data of first to third data is normal. If the time-out operation occurs, it is determined that first to third data is always abnormal.

In this case, if the result "YES" is determined at step SP82, the process is normally terminated. Otherwise, if the result "NO" is determined at step SP82, the process goes to step SP84, a predetermined error process is executed at step SP82, and the above routine is abnormally terminated.

Figure 14C:
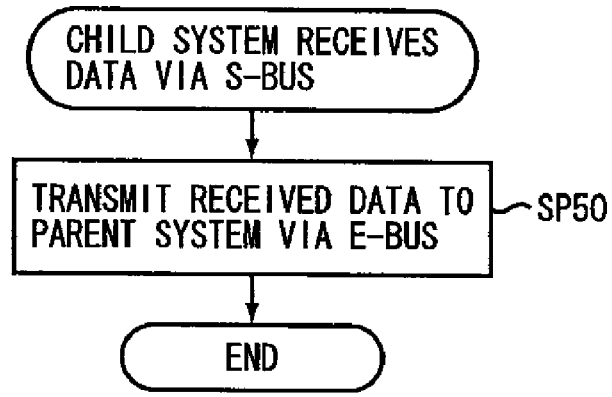

If the transmission request interrupt routine of FIG. 15b is normally terminated, the data reception event routine shown in FIG. 14c is operated. In FIG. 14b, if the process goes to step SP50, received first to third data is transmitted as E-bus packets to the parent system 220.

3.6. Grandchild System: Monitoring of Child System and Other Grandchild System

As described above, except for the arbitration packet 420, the status byte generated from the child system determines a specific grandchild system to be a communication party. There is no need to consider the packet caused by the status byte in other grandchild systems not equal to the communication party, such that the above-mentioned grandchild systems disregard the packet caused by the status byte.

However, in accordance with the preferred embodiment of the present invention, if each grandchild system is not determined to be a communication party, the grandchild system monitors the child system, resulting in increased system reliability. In this case, a detailed description of the above-mentioned operation will hereinafter be described with reference to the status byte reception event routine of FIG. 16.

As described above, if the status byte is received, it is determined whether the error check code 434 is correct at step SP104. The process of step SP104 is executed regardless of specific information indicating whether the grandchild system is set to the communication party. In a grandchild system not determined to be the communication party, the result "NO" is determined at step SP108, such that the process goes to step SP110. In this case, first to third data transmitted on the S-bus is sequentially received.

In the same manner as in the above step SP118, if first to third data is not received during the maximum time at step SP110, it is determined that the time-out operation occurs, such that the process of step SP110 is interrupted. If the process goes to step SP112, it is determined whether first to third data is normal at step SP112. If the result "YES" is determined at step SP112, this routine process is normally terminated. Otherwise, if a malfunction (e.g., a time-out operation) occurs, the result "NO" is determined. Therefore, the process goes to step SP114, and a predetermined error process is executed, such that the process is abnormally terminated.

3.7. Detailed Contents of Error Process

Although the error process has been executed at a plurality of steps (i.e., step SP84 of the transmission sub-routine (See FIG. 15*a*) for the grandchild system, and steps SP106, SP114, and SP122 of the status byte reception event routine of FIG. 16), the error process configures first to third data contained in the common protocol packet "C04:Others" so as to report detailed content data of the generated error, and transmits the first to third data to the parent system 220. In this case, if the child system detects a malfunction of the grandchild system and reports the detected malfunction to the parent system, there is no problem in a communication path. However, if the grandchild system detects a malfunction of the child system, it is determined that there is a problem.

In more detail, no communication path for directly reporting detailed contents of the generated error is provided between the grandchild system and the parent system 220, such that the grandchild system must transmit the common protocol packet reporting the detailed contents of the error to the parent system via the child system having the malfunction.

In this case, the child system may not switch the packet according to the error situation of the child system. However, if at least the switching function of the packet transmitted from the grandchild system to the parent system 220 is operated although any error occurs in the child system, a corresponding packet can be applied to the parent system. Therefore, if a malfunction or error occurs in the device, the parent system 220 can quickly recognize detailed contents of the malfunction or error.

For example, if the parent system can recognize a data congestion state of any child system, the parent system outputs the packet "C01:E-bus Start" to only the corresponding child system, such that it may reset the child system. As a result, the child system may be normally operated again.

4. Effects of Preferred Embodiments

As described above, the preferred embodiments have the following effects (1)~(5).

The first effect (1) is as follows. If the grandchild system generates content data of the data part 380, and the child system generates the header part 370, the E-bus packet is formed. The E-bus packet is transmitted to the parent system 220 according to the same format as in the packet formed by the child system. Therefore, if the parent system 220 receives the packet from any child system, there is no need to distinguish the received packet is equal to the packet entirely formed by the child system from the other packet switched by the child system. Therefore, in accordance with the preferred embodiment of the present invention, the number of devices on the E-bus directly managed by the parent system 220 can be extremely reduced. The CPU 272 of the grandchild system can use a low-priced CPU having no $I^2C$ function, resulting in reduction of overall production costs of a control system The second effect (2) is as follows. If packet transmission/reception is executed between the child system and the grandchild system, the packet begins by the status bytes 401, 411, and 412 generated from the child system. By the status byte, the device for outputting first to third data or the reply byte 422 is specified to a single meaning. Therefore, a plurality of devices simultaneously begin to transmit data, such that data collision on the S-bus is prevented. In other words, the serial I/O section 246 of the child system and the serial I/O section 266 of the grandchild system can be configured without considering the above-mentioned data collision, costs of the above-mentioned serial I/O sections 246 and 266 can be further reduced.

The third effect (3) is as follows. Each grandchild system communicates with its upper rank child system. Specified information of the communication party from among output data of the grandchild system is needless. The grandchild system for outputting data to the S-bus is pre-limited to a grandchild system specified by the status byte, such that there is no need for the grandchild system to transmit even its address. Therefore, the serial I/O section 266 of the grandchild system need not add transmission/reception addresses to data, such that costs of the serial I/O section 266 can be further reduced.

The fourth effect (4) is as follows. The grandchild system, which is not designated as a communication party by the status byte, determines whether the error check code 434 is correct at steps SP104~SP106, and determines whether first to third data on the S-bus is normally outputted without error at steps SP108~SP114. Therefore, the grandchild system directly unconcerned with data communication can serve as a check device. Resources of the grandchild system can be effectively used, such that reliability of the digital mixer can be enhanced.

The grandchild system, which is not designated as a communication party by the status byte, recognizes the error check code 434. Therefore, when the grandchild system receives the status byte by which the grandchild system itself is designated as the communication party, the grandchild system can quickly and easily determine whether the error check code 434 contained in the received status byte is fair.

The fifth effect (5) is as follows. If there is a need for the grandchild system to transmit data in accordance with the preferred embodiment of the present invention, a signal line different from a data line for data transmission/reception transmits the transmission request signal (TXREQ) to the child system. Therefore, the grandchild system can inform the child system of the necessity of data transmission without interrupting packet communication. If an event such as an operator manipulation occurs, the above-mentioned configuration can more quickly inform the parent system of the event, as compared to the other configuration that waits for the falling action derived from the child system, and reports the necessity of data transmission from the grandchild system to the child system.

5. Modified Embodiment

Although the preferred embodiment of the present invention has been disclosed for illustrative purposes, those skilled in the art will appreciate that various modifications, additions and substitutions are possible, as in the following examples.

Figure 17:
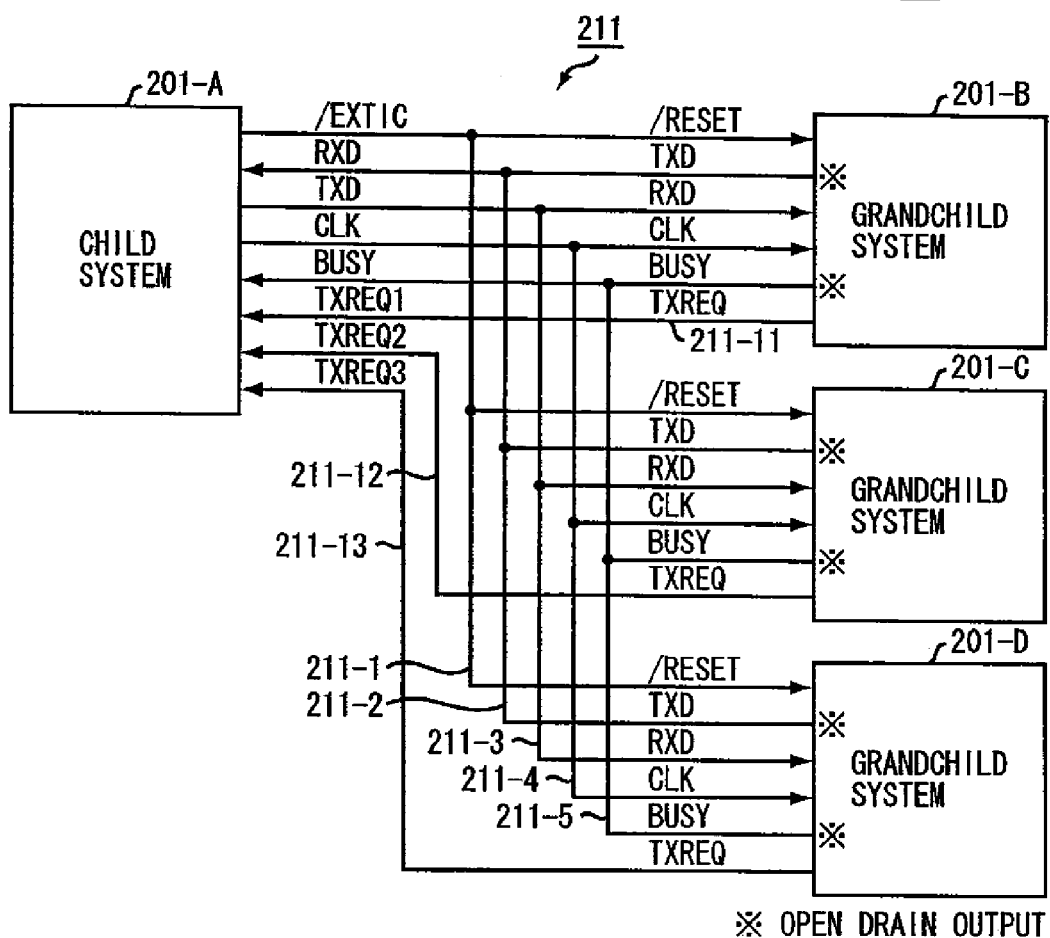
FIG. 17 is a block diagram illustrating a modified example of the S-bus system.

(1) In the above-mentioned preferred embodiment, the transmission request signals (TXREQ1~TXREQ3) of individual grandchild systems 201-B~201-D are supplied to the connection line 211-6, and the AND-operation result of the above-mentioned transmission request signals (TXREQ1~TXREQ3) are supplied as the transmission request signal (TXREQ) to the child system 201-A as shown in FIG. 8(a). However, as shown in FIG. 17, it is preferable that the above-mentioned transmission request signals (TXREQ1~TXREQ3) may be supplied to the child system 201-A via independent connection lines 211-11~211-13, respectively.

According to the above-mentioned configuration, the child system 201-A can immediately specify the grandchild system which has issued the transmission request on the basis of specific information indicating which one of connection lines 211-11~211-13 is set to "0". Therefore, if the grandchild system transmits the packet to the child system, there is no need to transmit/receive the arbitration packet.

Therefore, in the case of using the above-mentioned modified preferred embodiment, the signal process shown in FIG. 11 is omitted, the other signal process shown in FIG. 12 can be immediately executed. In this way, specific information indicating whether the child system receives the transmission request signals TXREQ1~TXREQ3 from individual grandchild systems without any change, or receives the AND-operation result of the transmission request signals TXREQ1~TXREQ3 is determined according to an operation speed required for the child system or an allowed circuit size of the child system, etc. There is no need to modify the configuration of the grandchild system even when the child system receives the transmission request signal (TXREQ) according to any scheme.

(2) Although the above-mentioned preferred embodiment uses the E-bus system and the S-bus system to perform communication between individual devices contained in the digital mixer, it should be noted that the present invention is not limited to communication inside of the digital mixer, and is applicable to a variety of control devices for use in a large-sized electronic musical instrument and a plurality of CPUs. In accordance with the preferred embodiment of the present invention, the E-bus and the S-bus are combined to form a communication path contained in the digital mixer. However, it is preferable that a small-sized device may configure the control system using only the S-bus.

The control system acquired by only the S-bus is configured by a combination of the master device for performing overall control operations and a slave device (i.e., the grandchild system) for performing some control operations under the control of the master device.

(3) In the above-mentioned preferred embodiment, although the error check code 434 is designed to be incremented by a predetermined number "1" whenever the status byte is generated, it should be noted that the present invention is not limited to the above-mentioned design, as long as the error check code 434 is changed according to a predetermined regulation or rule whenever the status byte is generated. Provided that each grandchild system can determine whether the error check code 434 is changed according to the regulation, any error check code can be applied to the preferred embodiment of the present invention.

(4) In the above-mentioned preferred embodiment of the present invention, although a variety of processes are executed by the program operated by the CPUs 228, 252, and 272 of individual systems, it should be noted that only the program can be stored in a recording medium (e.g., CD-ROM, and a flexible disc, etc.), the stored program can be distributed to users, or can also be distributed to the users via a transmission path.

The present invention is characterized by a configuration described below. Here, elements in parentheses are references for illustrative purposes. In accordance with the first aspect of the present invention, the inventive control system comprises: a first class bus (i.e., E-buses 216 and 217) for transmitting serial data; a plurality of first class devices (i.e., parent and child systems) connected to the first class bus, each of which has a unique address (i.e., address on E-bus), and transmits/receives a first class packet including source and destination addresses in terms of the unique addresses via the first class bus, thereby establishing mutual data communication; a plurality of second class buses (i.e., S-buses), each of which is independently connected to each of the first class devices, in association with at least some of the first class devices; a plurality of second class devices (i.e., grandchild systems) connected to the first class devices, respectively; a controllable element of the first type (fader or the like) directly controlled by the first class devices without using the second class devices; a plurality of controllable elements of the second types (switch, and rotary encoder, etc.) controlled by the second class devices, respectively; an element type determination section (SP8) contained in each of the first class devices, for receiving a first class packet, which includes not only controllable element identification (ID) information (port number, group number, and types) for identifying types of any controllable elements but also control data (first-data upper byte, LED brightness, and operation-amount value) for specifying control content associated with the identified controllable element, from the first class bus, and determining whether the identified controllable element is the first type or not on the basis of the identification information included in the received first class packet; a first setup section (SP10) contained in each of the first class devices, for establishing a state of the controllable element of the first type on the basis of the control data when the element type determination section (SP8) determines that the identified controllable element is the first type; a second class packet transmitter contained in each of the first class devices, for transmitting a second class packet, which is composed of second class device designation information for designating a target second class device, the identification information, and the control data, via the second class bus (packet 400) when the controllable element determination section (SP8) determines that the identified controllable element is not the first type; a self-designation determination section (SP108) contained in each of the second class devices, for determining whether the second class packet is indicative of a packet capable of controlling the controllable element of the second type controlled by the second class packet itself; a second setup section (SP26) contained in each of the second class devices, for establishing a state of the target controllable element of the second type on the basis of the control data when the self-designation determination section (SP108) determines that the second class packet is the packet capable of controlling the controllable element of the second type; a second class data transmitter (SP126) contained in each of the second class devices, for detecting the presence or absence of a manipulation of the controllable element of the second type controlled by the second class data device itself, and outputting second class data (first to third data 412~414) composed of not only identification information identifying the controllable element of the second type but also control data indicating the detected manipulation via the second class bus; and a first class packet transmitter (SP50) contained in each of the first class devices, for transmitting a first class packet, which is formed by adding source and destination addresses in terms of the unique addresses to the second class data received from the second class bus, via the first class bus.

Preferably, the inventive control system further comprises a second class packet inspection section (SP110~SP114) contained in each of the second class devices, for determining whether the second class packet is normally outputted to the second class bus without an error even when the self-designation determination section (SP108) determines that the second class packet is not the packet capable of controlling the controllable element of the second type.

In accordance with the second aspect of the present invention, the inventive communication system includes a master device (child system) and a plurality of slave devices (grandchild systems) for transmitting/receiving serial data to the master device. The inventive communication system comprises a first connection line (211-3) for connecting a data output terminal (TXD) of the master device in parallel to respective data input terminals (RXD) of the slave devices; a second connection line (211-2) for connecting a data input terminal (RXD) of the master device in parallel to respective data output terminals (TXD) of the slave devices; a status information transmitter (SP64 and SP76) contained in the master device, for outputting both of address information (430) specifying one of the slave devices and status information (401 and 411) including a communication direction flag (432) indicating whether the master device receives or transmits data via the first connection line; a master data transmitter (Sp68) contained in the master device, for transmitting data for the specified slave device via the first connection line subsequently to the status information, if the communication direction flag (432) indicating that the master device transmits data is transmitted by the status information transmitter; and a slave data transmitter (SP126) contained in the respective slave devices, for transmitting data for the master device via the second connection line subsequently to the status information, if the communication direction flag (432) indicating that the master device receives data is transmitted by the status information transmitter and the slave data transmitter itself is specified by the address information (430).

Preferably, the status information (401 and 411) generated from the status information transmitter (SP64 and SP76) includes an error check code (434) changed (i.e., incremented by a predetermined number "1") according to a predetermined rule whenever the status information (401 and 411) is generated. The communication system further comprises: an error check code verifier (SP104) contained in each slave device, for verifying whether the error check code (434) is fair irrespective of whether the slave device itself is determined by the address information 430.

Preferably, the inventive communication system further comprises: a third connection line for transmitting a transmission request signal (TXREQ) from each slave device to the master device; a transmission request section (SP36) contained in each slave device, for outputting the transmission request signal (TXREQ) via the third connection line; and a slave device determination section (SP74) contained in the master device, for determining one of the slave devices having transmitted the transmission request signal (TXREQ) as a slave device as specified by address information (430).

What is claimed is:

1. A control system for an apparatus having an operation panel and a plurality of controllable elements on the operation panel, said plurality of controllable elements specified by identification information and divided into a plurality of sections, the control system comprising:
a first class bus to transfer a first class packet, the first class packet being routed based on a destination address contained in the first class packet on the first class bus;
a parent device connected to the first class bus having an address unique on the first class bus;
a plurality of child devices connected to the first class bus, each child device having an address unique on the first class bus, and corresponding to one of said sections;
a plurality of second class buses, corresponding to said plurality of child devices, to transfer second class data, each of the second class buses being connected to a corresponding one of the child devices;
a plurality of grandchild devices, each grandchild being connected to one of the second class buses and corresponding to one of said sections; and
wherein said parent device comprises:
a first class transmitter to generate and transmit a first class packet, containing a destination address designating the unique address of one of the child devices, identification information designating one of the controllable elements, and control data to control the designated one of the controllable elements, via the first class bus to the designated one of the child devices to control the designated one of the controllable elements; and
a first class receiver to receive a first class packet, containing a destination address designating the unique address of the parent device, identification information designating one of the controllable elements, and control data of the designated one of the controllable elements, via the first class bus from one of the child devices to report a user operation on the designated one of the controllable elements;
wherein each of said child devices comprises:
the controllable elements of the one section corresponding to the child device;
a first class receiver to receive a first class packet, containing the destination address designating the unique address of the child device, transmitted by the parent device via the first class bus;
a controller, in response to said first class packet received by said first class receiver of the child device, to control one of the controllable elements of the one section corresponding to the child device if the identification information in the received first class packet designates any of the controllable elements of the one section corresponding to the child device;
a second class transmitter, in response to said first class packet received by said first class receiver of the child device, to generate and transmit second class data containing identification information and control data being the same as the identification information and the control data in the received first class packet to one of the grandchild devices via the second class bus corresponding to the child device if the identification information in the received first class packet does not designate any of the controllable elements of the one section corresponding to the child device;
a detector to detect a user operation on any controllable element of the one section corresponding to the child device;
a second class receiver for receiving second class data from one of the grandchild devices via the second class bus corresponding to the child device; and
a first class transmitter to, when said detector detects said user operation on a controllable element of the one section corresponding to the child device, generate and transmit a first class packet containing a destination address designating the unique address of the parent device, identification information designating the operated controllable element, and control data indicating the detected operation on the operated controllable element, to the parent device via the first class bus, and, when said second class receiver of the child device receives said second class data containing identification information and control data, said first class transmitter of the child device for generating and transmitting a first class packet containing an address designating the parent device, identification information and control data being the same as the identification information and the control data in the received second class data, to the parent device via the first class bus, and wherein each of said grandchild devices comprises:

the controllable elements of the one section corresponding to the grandchild device;

a second class receiver to receive second class data transmitted via the second class bus by the child device corresponding to the second class bus;

a controller, in response to said second class data received by said second class receiver of the grandchild device, to control one of the controllable elements of the one section corresponding to the grandchild device if the identification information in the received second class data designates any of the controllable elements of the one section corresponding to the grandchild device;

a detector to detect a user operation on any controllable element of the one section corresponding to the grandchild device; and a second class transmitter, when said detector detects said user operation on a controllable element of the one section corresponding to the grandchild device, to generate and transmit second class data containing identification information designating the operated controllable element, and control data indicating the detected operation on the operated controllable element, via the second class bus to the child device corresponding to the second class bus.

2. The control system as set forth in claim 1, wherein a plurality of said grandchild devices are connected via a second class bus to the child device corresponding to the second class bus, wherein, when said first class receiver of said child device receives the first class packet containing the identification information designating the one controllable element of the one section corresponding to one of the plurality of grandchild devices, said second class transmitter of said child device generates designation information designating the one of the plurality of grandchild devices and transmits the second class data to the grandchild device designated by the designation information via the second class bus, and wherein said second class receiver of the grandchild device, designated by the designation information, receives the second class data via the second class bus.

3. The control system as set forth in claim 1, wherein each of the first class packets further contains a source address designating the unique address of one of the parent device and the child devices connected to the first class bus that generates the first class packet.

4. The control system as set forth in claim 1, wherein the plurality of the controllable elements on said operation panel are controls manually operable for manipulation and indicators controllable to indicate the state of the controls.

5. The control system as set forth in claim 4, wherein said controls on said operation panel include switches, each of the switches having an LED indicating On/Off state of a parameter corresponding to the switch.

6. The control system as set forth in claim 4, wherein said controls on said operation panel include rotary encoders.

7. The control system as set forth in claim 1, wherein the plurality of the controllable elements on said operation panel include faders, each of the faders having a drive device.

8. The control system as set forth in claim 1, wherein the plurality of the controllable elements on said operation panel include a touch-screen.

9. The control system as set forth in claim 2, further comprising a second class inspection section contained in each of the plurality of grandchild devices connected to the child device via the second class bus, each second class inspection section to determine whether the second class data is outputted without an error to the second class bus even when the designation information generated by the child device does not designate the grandchild device containing the second class inspection section.

10. The control system as set forth in claim 1, wherein the plurality of controllable elements are previously allotted with respected port numbers, the identification information in the first class packet received by the child device designates the one of the controllable elements by specifying the port number, and said controller of the child device and said second class transmitter of the child device determine, if the identification information in the received first class packet designates the one of the controllable elements of the one section or not, according to the port numbers specified by the identification information in the received first class packet.

11. The control system as set forth in claim 2, wherein the plurality of controllable elements are previously allotted with respective port numbers, the identification information in the first class packet received by the child device designates the one of the controllable elements by specifying the port number, and the second class data transmitter generates the designation information according to the port number specified by the identification information in the received first class packet.

12. The control system as set forth in claim 1, wherein the second class bus corresponding to a child device contains an interrupt line connecting between the child device and a plurality of the grandchild devices connected to the second class bus, such that each grandchild device can send a request signal to the child device through the interrupt line for requesting transmission of the second class data at the initiative of the grandchild device.

13. The control system as set forth in claim 1, used for controlling a digital mixer.

14. A communication system including a master device and a plurality of slave devices for transferring data in a serial form from one of the slave devices to the master device and transferring data in a serial form from the master device to one of the slave devices, the communication system comprising:

a first connection line provided for connecting an output terminal of the master device in parallel to respective input terminals of the slave devices;

a second connection line provided for connecting an input terminal of the master device in parallel to respective output terminals of the slave devices;

a status information transmitter contained in the master device, for transmitting status information containing an address specifying one of the slave devices and a flag indicating a direction of data transfer, via the first connection line;

a status information receiver contained in the respective slave devices, for receiving the status information transmitted by said status information transmitter via the first connection line;

a master data transmitter contained in the master device for transmitting data following the status information via the first connection line, if the flag in the status information indicates data transfer from the master device to one of the slave devices, a slave data receiver contained in the respective slave devices, for receiving the data transmitted by said master data transmitter following the status information via the first connection line if the flag in the status information, received by said status information receiver, indicates the data transfer from the master device to one of the slave devices, and the address in the status information specifies the slave device;

a slave data transmitter contained in the respective slave devices, for transmitting the data via the second line, following the status information if the flag in the status information, received by said status information receiver, indicates data transfer from one of the slave devices to the master device, and the address in the status information specifies the slave device; and a master data receiver contained in the master device, for receiving the data transmitted by the slave data transmitter following the status information via the second connection line if the flag in the status information indicates the data transfer from one of the slave devices to the master device.

15. The communication system as set forth in claim 14, wherein the status information transmitter generates the status information including an error check code which is changed according to a predetermined rule whenever the status information is generated, the communication system further comprising an error check code verifier contained in each slave device, for verifying the error check code irrespective of whether the address information specifies the corresponding slave device or another slave device.

16. The communication system as set forth in claim 14, further comprising:

a third connection line provided for transmitting a transmission request signal from each slave device to the master device;

a transmission request section contained in each slave device, for outputting the transmission request signal via the third connection line when transmission of data is required by each slave device; and a slave device determination section contained in the master device, for determining one or more of the slave devices which has transmitted the transmission request signal to a target slave device such that address information of the target slave device is generated together with the status information.

17. The communication system as set forth in claim 14, used for controlling a digital mixer which is composed of a parent device, a plurality of child devices connected as the master device to the parent device through the first connection line, and a plurality of grandchild devices connected as the slave device to at least one of the child devices through the second connection line.

\* \* \* \* \*